United States Patent [19]
Kitayama et al.

[11] Patent Number: 5,785,824
[45] Date of Patent: Jul. 28, 1998

[54] METHOD OF AND APPARATUS FOR PRODUCING OZONE

[75] Inventors: Jiro Kitayama; Toshinori Yagi; Masaaki Tanaka; Norikazu Tabata, all of Tokyo, Japan

[73] Assignee: Mitsubishi Denki Kabushiki Kaisha, Tokyo, Japan

[21] Appl. No.: 712,845

[22] Filed: Sep. 12, 1996

[30] Foreign Application Priority Data

Sep. 28, 1995 [JP] Japan ..................... 7-251018
Dec. 19, 1995 [JP] Japan ..................... 7-330344

[51] Int. Cl.$^6$ ..................... C01B 13/11
[52] U.S. Cl. ............ 204/176; 422/186.07; 422/186.08
[58] Field of Search ............ 422/186.07, 186.08; 204/176

[56] References Cited

U.S. PATENT DOCUMENTS 5,034,198  7/1991  Kaiga et al. ............ 422/186.07
5,370,846  12/1994  Yokomi et al. ............ 6/3

FOREIGN PATENT DOCUMENTS

59/48761    11/1984  Japan.
WO 91/00247  1/1991  Japan.
3/800247     6/1991  Japan.

Primary Examiner—Kathryn L. Gorgos
Assistant Examiner—Kishor Mayekar
Attorney, Agent, or Firm—Burns, Doane, Swecker & Mathis, LLP

[57] ABSTRACT

An ozone producing apparatus including: an oxygen atom producing portion (6) for dissociating a supplied oxygen gas at a low pressure not more than atmospheric pressure so as to produce a first gas containing oxygen atoms; an ozone producing portion (a throat 3 and a diffuser 4) for mixing the first gas containing oxygen atoms supplied from the oxygen atom producing portion with a second gas containing oxygen, and allowing the first and second gases to react with each other for producing ozone; and a low pressure feeding (2, 9) means for reducing a pressure in the oxygen atom producing portion (6) at a specified low value not more than atmospheric pressure, and feeding the first gas to the ozone producing portion in a pressure reduction state.

19 Claims, 22 Drawing Sheets

PRESSURE IN ELECTRIC DISCHARGE FIELD [P (Torr)]

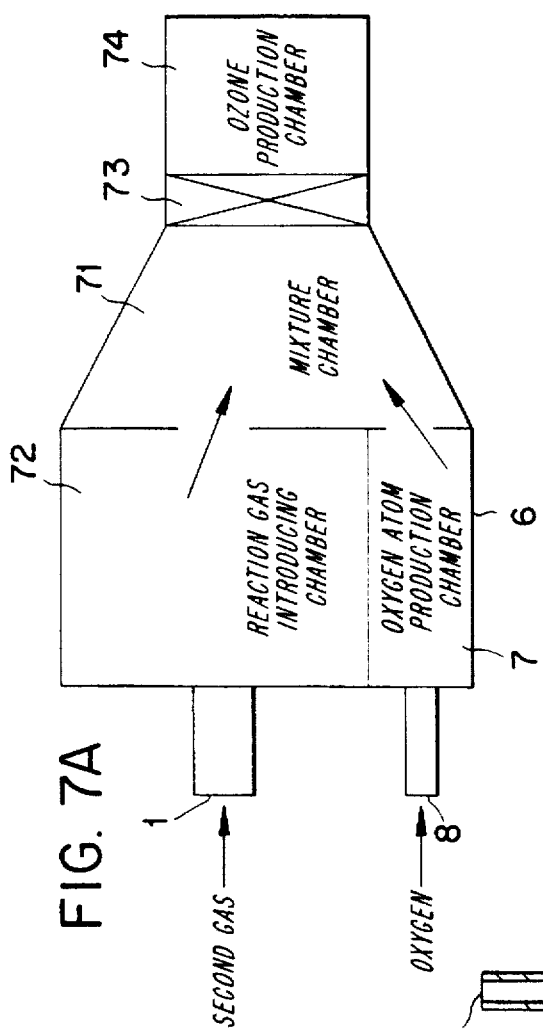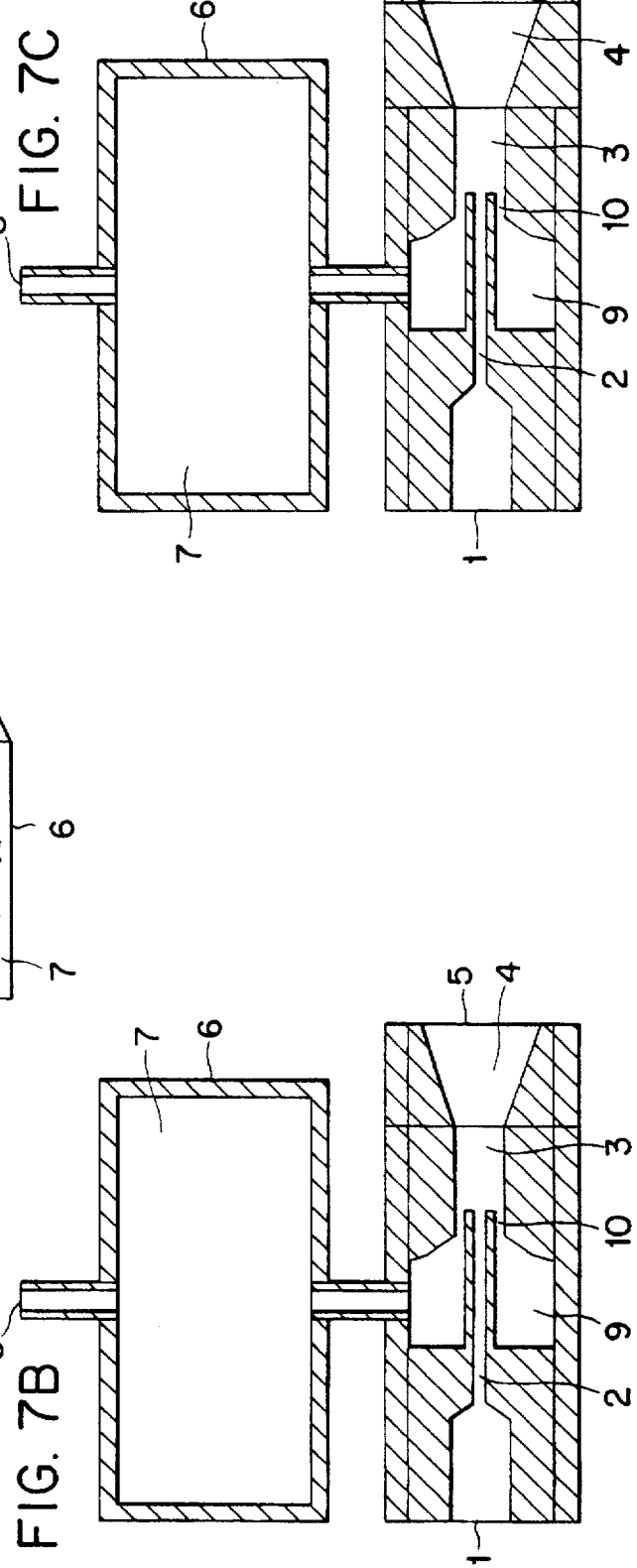

$e + O_2 \rightarrow O + O + e$ $O_2 + O_2 \rightarrow O + O + O_2$

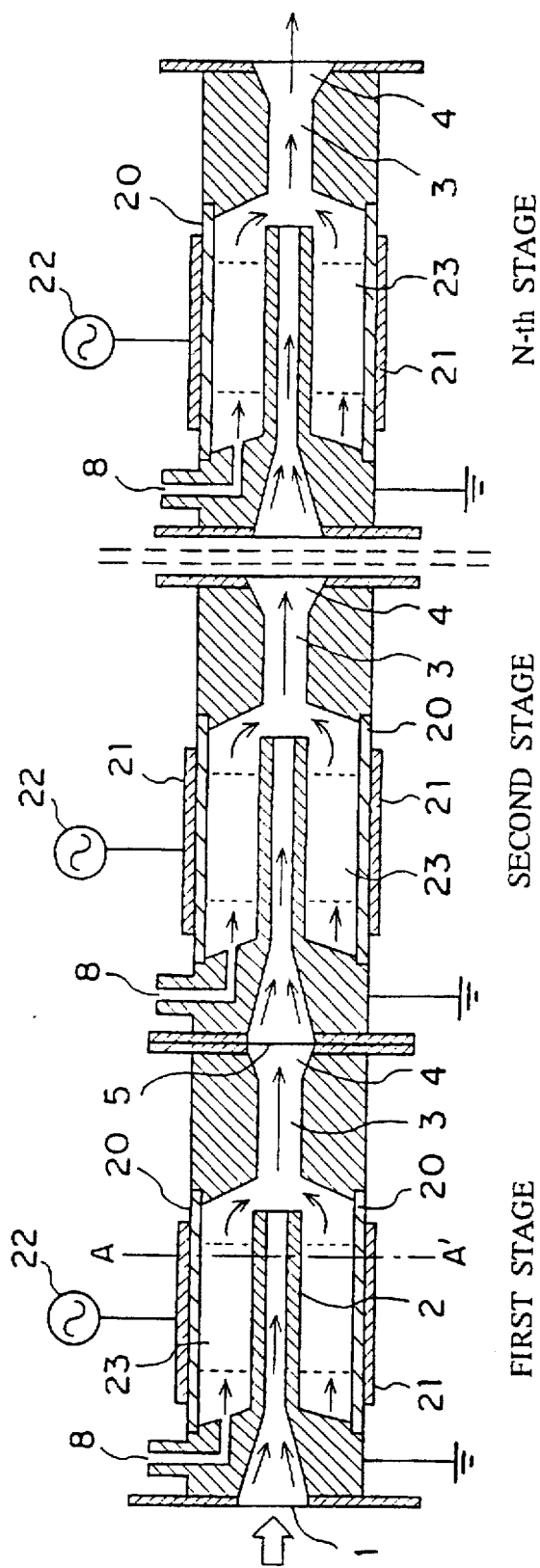
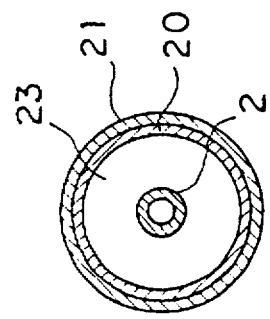
FIG. 29A
FIG. 29B

METHOD OF AND APPARATUS FOR PRODUCING OZONE

BACKGROUND OF THE INVENTION

1. Field of the Invention

The present invention relates to a method of and apparatus for producing ozone using air as a source gas, and particularly to a method of and apparatus for efficiently producing ozone in a high concentration while keeping a high ozone conversion efficiency.

2. Description of the Prior Art

FIG. 31 shows a prior art coaxial cylinder shaped silent discharge type ozone producing apparatus disclosed, for example, in Japanese Patent Publication JP-B 59/48761.

Referring to FIG. 31, reference numeral 41 indicates a can-shaped body containing a grounding metal pipe 42 having a cooling water inlet 49 and a cooling water outlet 50, and having a source gas (air or oxygen) inlet 51 and an ozone gas outlet 52 which are formed at specified positions; and reference numeral 44 indicates a high voltage electrode pipe made of a dielectric substance such as glass, which is coaxially inserted in the grounding metal pipe 42 in such a manner as to form a specified electric discharge space 43 between the grounding metal pipe 42 and the high voltage electrode pipe 44 by means of a plurality of spacers 53. The high voltage electrode pipe 44 is coated on the inner peripheral surface with a conductive thin film 45.

Reference numeral 46 indicates an electric supply terminal for applying a high voltage AC from an electric supply line 47 to the conductive thin film 45 through a bushing 48.

While the prior art apparatus shown in FIG. 31 includes the can-shaped body 41 having a pair of the grounding metal pipe 42 and the high voltage electrode pipe 44, some prior art ozone producing apparatuses are also known, which are of a type including the can-shaped body 41 having many pairs of the grounding metal pipes 42 and the high voltage electrode pipes 44 in accordance with a required ozone generation capacity.

The operation of the prior art apparatus having the above configuration will be described. When a high voltage AC is applied to the high voltage electrode pipe 44, a gentle glow discharge called a silent discharge is generated at the electric discharge space 43 to convert a supplied source air into ozone, and a gas containing ozone thus converted is taken out of the apparatus through the ozone gas outlet 52. The electric discharge space 43 is heated by electric discharge, and consequently, unless the space 43 is effectively cooled, a gas temperature in the electric discharge space 43 is increased and thereby the produced amount of ozone is reduced. For this reason, the grounding metal pipe 42 is cooled by cooling water. In the prior art silent discharge type ozone producing apparatus for simultaneously producing oxygen atoms (O) and ozone ($O_3$) in the electric discharge space, the electric discharge space must be kept at a high pressure and a low temperature which are required for producing ozone. In order to keep the temperature of the electric discharge space at a low value, the prior art apparatus has a structure in which the gap of the electric discharge space is shortened and either or both of the grounding metal pipe and the high voltage electrode pipe are water-cooled.

The shortening of the gap of the electric discharge space is disadvantageous in that the cylindrical grounding metal pipe and the cylindrical high voltage electrode pipe must be processed at high accuracies for keeping uniformity of the short gap over the entire length of the electric discharge space formed between the cylindrical electrodes, resulting in the increased initial manufacturing cost.

The prior art apparatus is also complicated in structure. For example, the electrode structure is limited by provision of a means for cooling either or both of the electrodes. Moreover, even when either or both the electrodes are cooled, it is difficult to apply a high density power (discharge power/discharge area) because the temperature in the electric discharge space must be suppressed in a range of about 350K or less from the viewpoint of ozone production efficiency. This makes it impossible to realize a compact apparatus.

In the silent discharge type ozone producing apparatus, ozone produced in the electric discharge field partially collides with electrons present in the electric discharge space, to be thus decomposed again as seen from the following reaction formula:

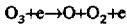

The reaction rate in the above reaction formula, which is a function of an electron energy, is larger several times to several ten times than a dissociation rate of oxygen atoms due to collision with electrons in the electric discharge field, that is, production rate of oxygen atoms.

Accordingly, in the silent discharge type ozone producing apparatus for simultaneously producing oxygen atoms and ozone by electric discharge, the ozone produced once is partially returned into oxygen atoms or oxygen molecules, lowering the energy efficiency for ozone production.

In the silent discharge type ozone producing apparatus in which air is used as a source gas, nitrogen atoms (N) and excited species thereof which are produced by collision of nitrogen molecules ($N_2$) with electrons react with oxygen atoms to produce nitrogen oxide ($NO_x$), and ozone partially reacts with $NO_x$ to be decomposed, lowering the ozone production efficiency like the above case.

The disadvantages of the silent discharge type ozone producing apparatus for simultaneously producing oxygen atoms and ozone are summarized as follows:

(1) The structure of the apparatus, particularly, the electrode system is complicated because the apparatus is required to be cooled.

(2) It is difficult to realize a compact apparatus because a high density power cannot be applied.

(3) The ozone production efficiency is low because ozone produced once is partially decomposed by collision with electrons in an electric discharge field.

(4) The ozone production efficiency is further lowered in the case of using air as a source gas because ozone partially reacts with $NO_x$ generated by collision of $N_2$ with electrons to be decomposed.

SUMMARY OF THE INVENTION

In view of the foregoing, the present invention has been made, and an object of the present invention is to provide a method of producing ozone at a high ozone production efficiency, which is capable of mixing oxygen atoms in a suitable concentration with a reaction gas for increasing an ozone production efficiency by separating the production of oxygen atoms from that of ozone, and which is also capable of efficiently producing ozone in a high concentration while suppressing lowering of the ozone production efficiency by injecting produced oxygen atoms in the reaction gas in such a manner that the injection of the oxygen atoms is repeated a plurality of times; and a compact and cheap ozone producing apparatus used for the method.

According to a preferred embodiment of the present invention, there is provided a method of producing ozone, including: an oxygen atom producing step of producing a first gas containing oxygen atoms by dissociating a supplied oxygen gas at a specified low pressure not more than atmospheric pressure; and an ozone producing step of mixing the first gas containing oxygen atoms produced in the oxygen atom producing step with a second gas containing oxygen, and allowing the first gas and the second gas to react with each other in a non-electric discharge state for producing ozone.

According to another preferred embodiment of the present invention, air is used as the second gas.

According to a further preferred embodiment of the present invention, the oxygen atom producing step uses non-equilibrium electric discharge as the means for dissociating an oxygen gas.

According to a further preferred embodiment of the present invention, the oxygen atom producing step uses thermal plasma as the means for dissociating an oxygen gas, and the ozone producing step cools the mixed gas of the first and second gases in the mixing step of the first and second gases.

According to a further preferred embodiment of the present invention, there is provided an ozone producing apparatus including: an oxygen atom producing portion for dissociating a supplied oxygen gas at a low pressure not more than atmospheric pressure so as to produce a first gas containing oxygen atoms; an ozone producing portion for mixing the first gas containing oxygen atoms supplied from the oxygen atom producing portion with a second gas containing oxygen, and allowing the first and second gases to react with each other for producing ozone; and a low pressure feeding means for reducing a pressure in the oxygen atom producing portion at a specified low value not more than atmospheric pressure, and feeding the first gas to the ozone producing portion in a pressure reduction state.

According to a further preferred embodiment of the present invention, non-equilibrium electric discharge is used as the means for dissociating an oxygen gas in the oxygen atom producing portion.

According to a further preferred embodiment of the present invention, glow discharge is used as the non-equilibrium electric discharge.

According to a further preferred embodiment of the present invention, silent discharge is used as the non-equilibrium electric discharge.

According to a further preferred embodiment of the present invention, microwave discharge is used as the non-equilibrium electric discharge.

According to a further preferred embodiment of the present invention, the oxygen atom producing portion uses thermal plasma as the means for dissociating an oxygen gas, and the ozone producing portion cools the mixed gas of the first and second gases in the mixing step of the first and second gases.

According to a further preferred embodiment of the present invention, the low pressure feeding means includes: an inlet into which the second gas pressurized is injected; a nozzle, disposed spaced from the ozone producing portion at a specified gap, for jetting the second gas injected from the inlet to the ozone producing portion; and a pressure reduction chamber disposed in the vicinity of the nozzle and the gap, which is reduced in pressure by jetting of the second gas from the nozzle, thereby reducing the pressure in the oxygen atom producing portion at a specified low value not more than atmospheric pressure and feeding the first gas containing oxygen atoms produced by the oxygen atom producing portion to the ozone producing portion through the gap in a pressure reduction state.

According to a further preferred embodiment of the present invention, there is provided a method of producing ozone, including: an oxygen atom producing step of producing a first gas containing oxygen atoms by dissociating a supplied oxygen gas at a specified low pressure not more than atmospheric pressure; and an ozone producing step of mixing the first gas containing oxygen atoms produced in the oxygen atom producing step with a second gas containing oxygen, and allowing the first gas and the second gas to react with each other in non-electric discharge state for producing ozone, wherein the ozone producing step is divided into a plurality of stages for repeating production of ozone by adding the first gas to the second gas containing oxygen pressurized and supplied and accumulating ozone produced in each of the stages.

According to a further preferred embodiment of the present invention, there is provided an ozone producing apparatus including: an oxygen atom producing portion for dissociating a supplied oxygen gas at a low pressure not more than atmospheric pressure so as to produce a first gas containing oxygen atoms; a plurality of ozone producing units arranged in series, each of the ozone producing units being adapted to mix the first gas with a second gas containing oxygen pressurized and supplied thereto, and allowing the first and second gases to react with each other at a specified oxygen atom concentration in a non-electric discharge state for producing ozone; and low pressure feeding means for reducing a pressure in the oxygen atom producing portion to a low value not more than atmospheric pressure and feeding the first gas to each of a plurality of the ozone producing units in a pressure reduction state, whereby sequentially feeding the second gas containing ozone in a plurality of the ozone producing units in the flow direction of the second gas for accumulating ozone produced in each of the ozone producing units.

According to a further preferred embodiment of the present invention, each of a plurality of the ozone producing portions is formed in a one-body including the oxygen atom producing portion and the low pressure feeding means by using a pressure reduction chamber of the corresponding one of the low pressure feeding means as the oxygen atom producing portion.

According to a further preferred embodiment of the present invention, there is provided an ozone producing apparatus including: an oxygen atom producing portion for dissociating a supplied oxygen gas at a low pressure not more than atmospheric pressure so as to produce a first gas containing oxygen atoms; an ozone producing portion for mixing the first gas containing oxygen atoms supplied from the oxygen atom producing portion with a second gas containing oxygen, and allowing the first and second gases to react with each other for producing ozone; and a low pressure feeding means for reducing a pressure in the oxygen atom producing portion at a specified low value not more than atmospheric pressure, and feeding the first gas to the ozone producing portion in a pressure reduction state, wherein the ozone producing portion has a plurality of rows of holes spaced from each other at specified intervals in the flow direction of the second gas, and the low pressure feeding means feeds the first gas to the ozone producing portion through a plurality of rows of the holes while keeping the pressure reduction state of the first gas.

BRIEF DESCRIPTION OF THE DRAWINGS

FIG. 7A is a schematic explanatory view showing the configuration of an ozone producing apparatus according to the present invention;

FIG. 7B is a schematic sectional view showing the configuration of an ozone producing apparatus according to a first embodiment of the present invention;

FIG. 7C is a schematic sectional view showing the another configuration of an ozone producing apparatus according to a first embodiment of the present invention;

FIGS. 12A, 12B are schematic sectional views showing the configuration of an ozone producing apparatus according to a sixth embodiment of the present invention, wherein FIG. 12A is a vertical sectional view of an essential portion of the apparatus, and FIG. 12B is a sectional view taken on line A—A of FIG. 12A;

FIGS. 29A, 29B are schematic sectional views showing the configuration of a fourteenth embodiment of the present invention;

DETAILED DESCRIPTION OF THE PREFERRED EMBODIMENTS

Hereinafter, preferred embodiments of the present invention will be described with reference to the accompanying drawings.

Embodiment 1

Figure 1:
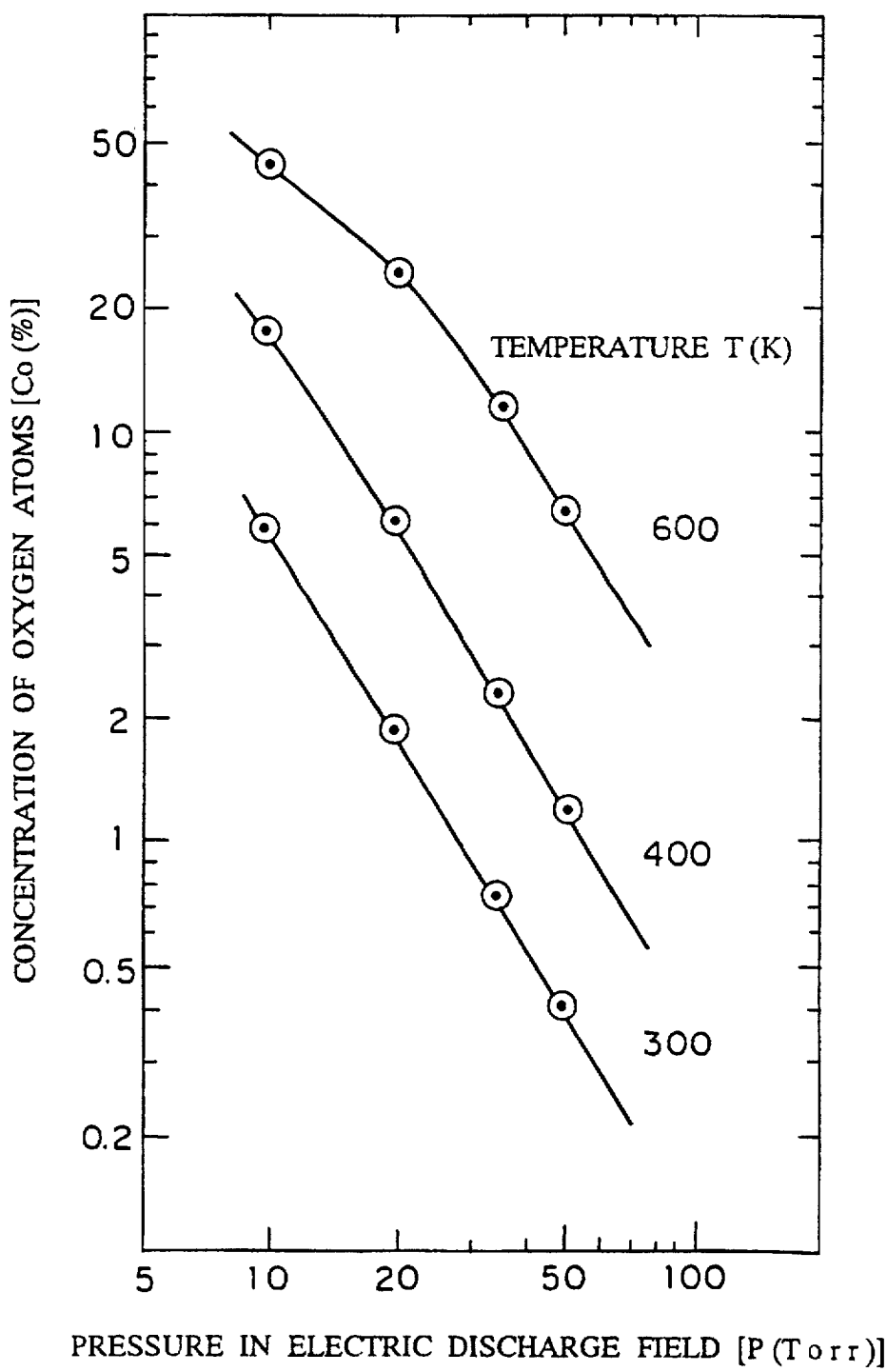
FIG. 1 is a graph showing a pressure dependency on a concentration of oxygen atoms produced by dissociation resulting from collision of oxygen molecules with electrons.

FIG. 1 is a graph showing a pressure dependency on a steady-state concentration of oxygen atoms produced by reaction due to collision between oxygen molecules and electrons and between oxygen molecules in an electric discharge field in an oxygen gas, with a temperature in the electric discharge field used as a parameter.

The graph shows that electric discharge at a low pressure is advantageous for production of oxygen atoms because the concentration of oxygen atoms is decreased with an increase in pressure of the electric discharge field.

The graph also shows that oxygen atom in a higher concentration is produced as the temperature of the electric discharge field is increased when the pressure of the electric discharge field is set at a constant value.

In summary, it is advantageous that the production of oxygen atoms is performed in the condition reversed to the operating condition for the prior art silent discharge type ozone producing apparatus, that is, at a low gas pressure and a high temperature.

Figure 2:
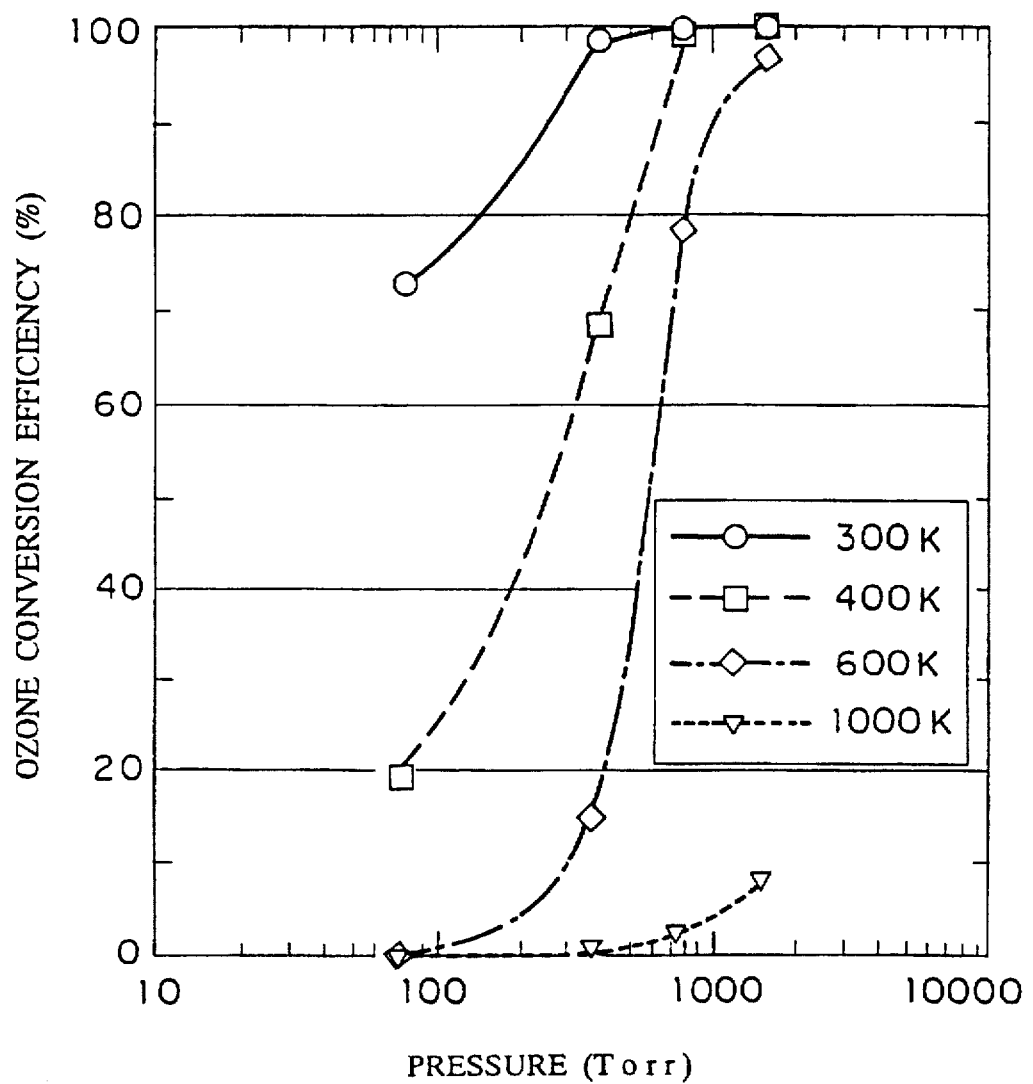
FIG. 2 is a graph showing a pressure dependency on the efficiency of conversion from oxygen atoms to ozone with a gas temperature used as a parameter.

FIG. 2 is a graph showing a pressure dependency on an ozone conversion efficiency (defined by number of produced ozone molecules/number of initial oxygen atoms) in the step of conversion of oxygen atoms produced by electric discharge into ozone by way of three body collision, with a temperature of a reaction space used as a parameter.

The graph shows that oxygen atoms can be converted into ozone at a high efficiency by setting a pressure in a reaction chamber at a value as relatively high as about atmospheric pressure and also setting the temperature of the reaction chamber at a value as small as possible (at least 400K or less).

Figure 3:
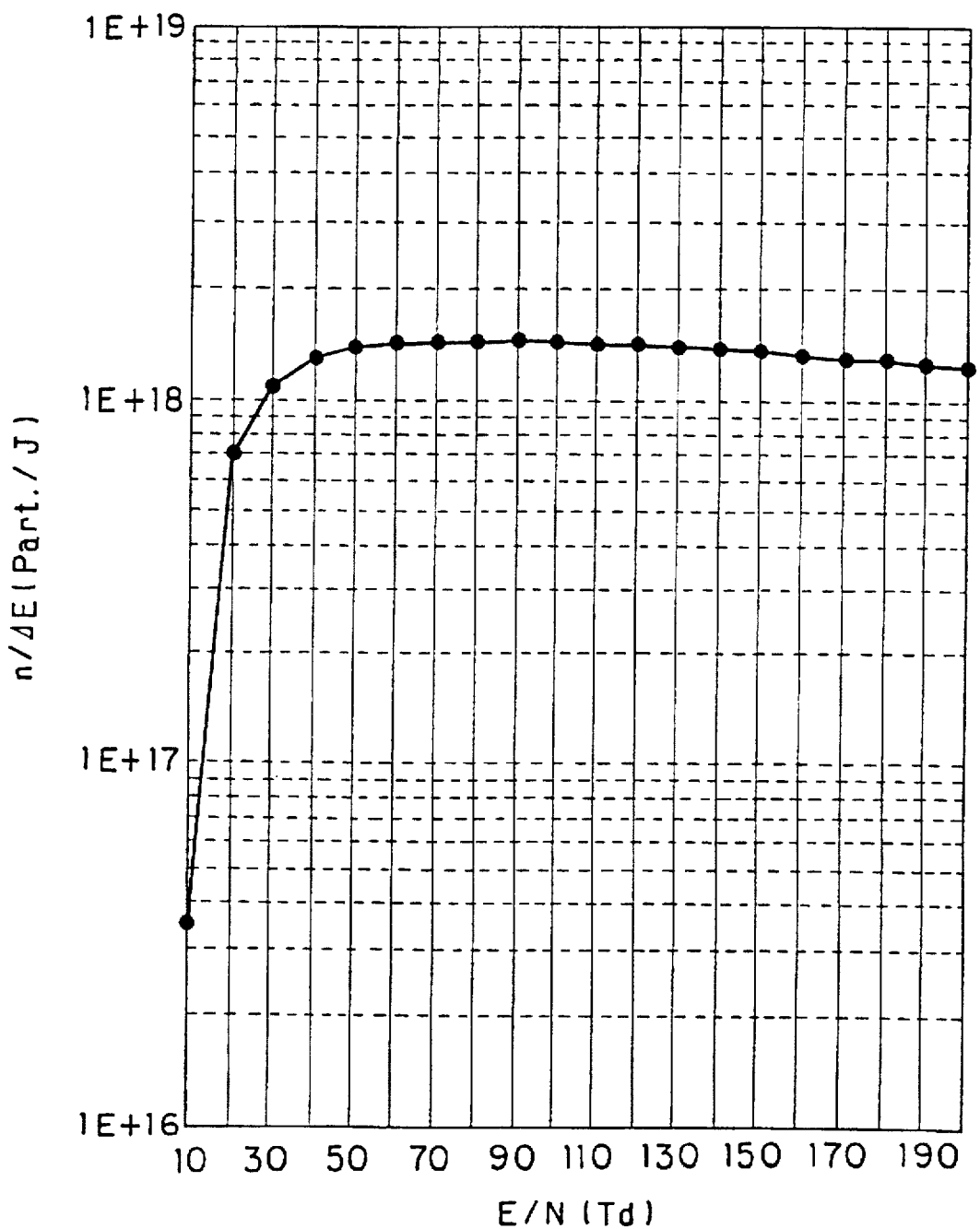
FIG. 3 is a graph showing a relationship between a production efficiency of oxygen atoms produced by dissociation resulting from collision of oxygen molecules with electrons and an electric field strength.

FIG. 3 is a graph showing a production efficiency of oxygen atoms produced by dissociation resulting from collision between oxygen atoms and electrons, wherein the abscissa indicates an electric field strength in the electric discharge field.

The scale E/N of the abscissa is a parameter obtained by normalizing an electric field (V/cm) in an electric discharge space based on a particle density N (particle/cm$^3$), which shows an electric discharge state. In addition, the unit of E/N, 1 Td (Townsend), is 1E-17 Vcm$^2$.

The ordinate in the graph indicates the number of oxygen atoms produced in the electric discharge field in an oxygen gas per unit energy, that is, an energy efficiency for production of oxygen atoms.

Figure 4:
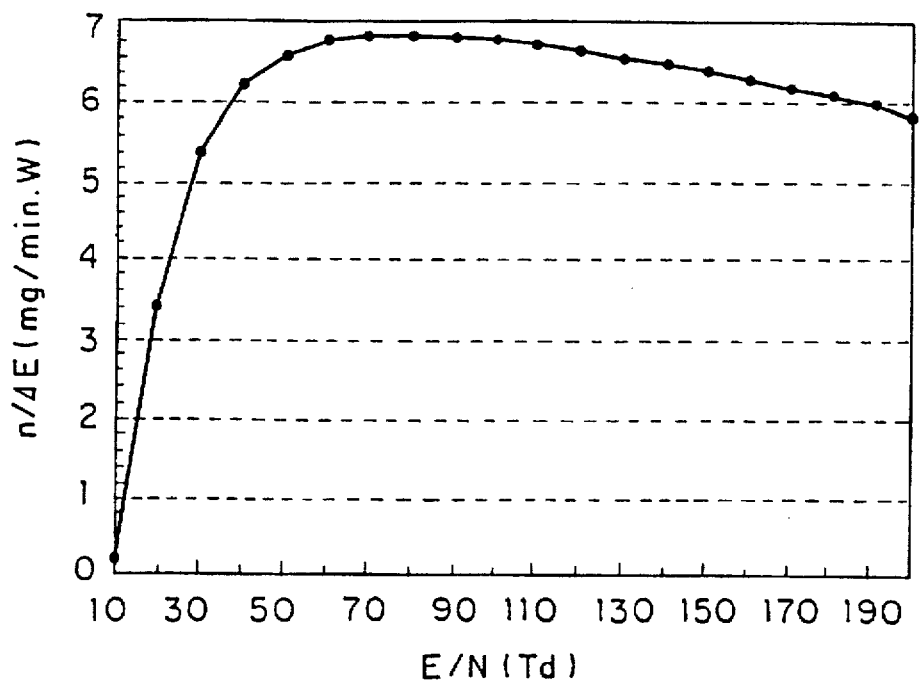
FIG. 4 is a graph showing a relationship between the ozone production efficiency and the electric field strength of an electric discharge field on the assumption that oxygen atoms produced by dissociation are all converted into ozone.

FIG. 4 is a graph showing an energy efficiency for production of ozone on an assumption that oxygen atoms produced at the production efficiency shown in FIG. 3 by dissociation resulting from electric discharge are perfectly (100%) converted into ozone.

The graph shows that ozone can be produced at a high efficiency of about 7 mg/W/min if oxygen atoms are produced in an oxygen atom production chamber capable of forming an electric discharge field having an electric field strength of about 80 Td and are then perfectly (100%) converted into ozone in a reaction chamber in which the pressure is kept at a value as high as about atmospheric pressure and a temperature is set at a value as small as possible (at least 400K or less) as shown in FIG. 2.

In this regard, the present inventor examined the step in which a dissociated gas containing oxygen atoms is injected in an air at atmospheric pressure and a temperature of 350K to produce ozone by way of three body collision, by a computer simulation using a reaction formula between particles. The results are shown in FIG. 5.

Figure 5:
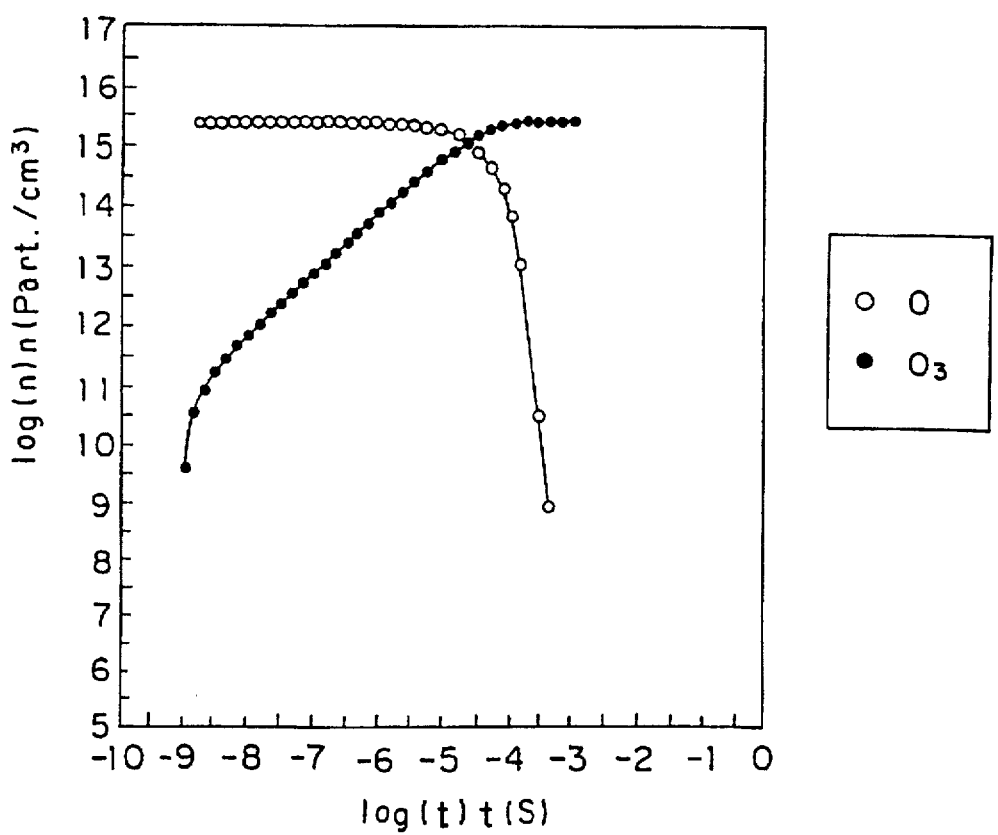
FIG. 5 is a graph showing a result of simulating a conversion step by a computer in which oxygen atoms produced by dissociation are converted into ozone by way of three body collision.

FIG. 5 is a graph showing changes in the numbers of particles of oxygen atoms and ozone with time in the step in which a dissociated gas containing oxygen atoms produced by electric discharge in an amount (number of particles) of 0.01% is mixed with an air at atmospheric pressure and a temperature of 350K to produce ozone. In this figure, the white circle indicates the number of particles of oxygen atoms and the black circle indicates the number of particles of ozone at each measurement time.

In this case, the oxygen atoms previously present are converted into ozone at a high ozone conversion efficiency of 99.4% after approximately one milli-second since mixing with air.

Accordingly, the ozone production efficiency in this case is nearly equal to that obtained on the assumption that all of produced oxygen atoms are converted into ozone (see FIG. 4). This shows that the inventive apparatus can produce ozone at a very high efficiency although the use of an oxygen gas is limited to the oxygen atom production chamber and an oxygen containing gas (for example, air) is used as a reaction gas, as compared with the prior art ozone producing apparatus in which the maximum ozone production efficiency is about 3.2 mg/W/min in the case of using oxygen as a source gas.

Figure 6:
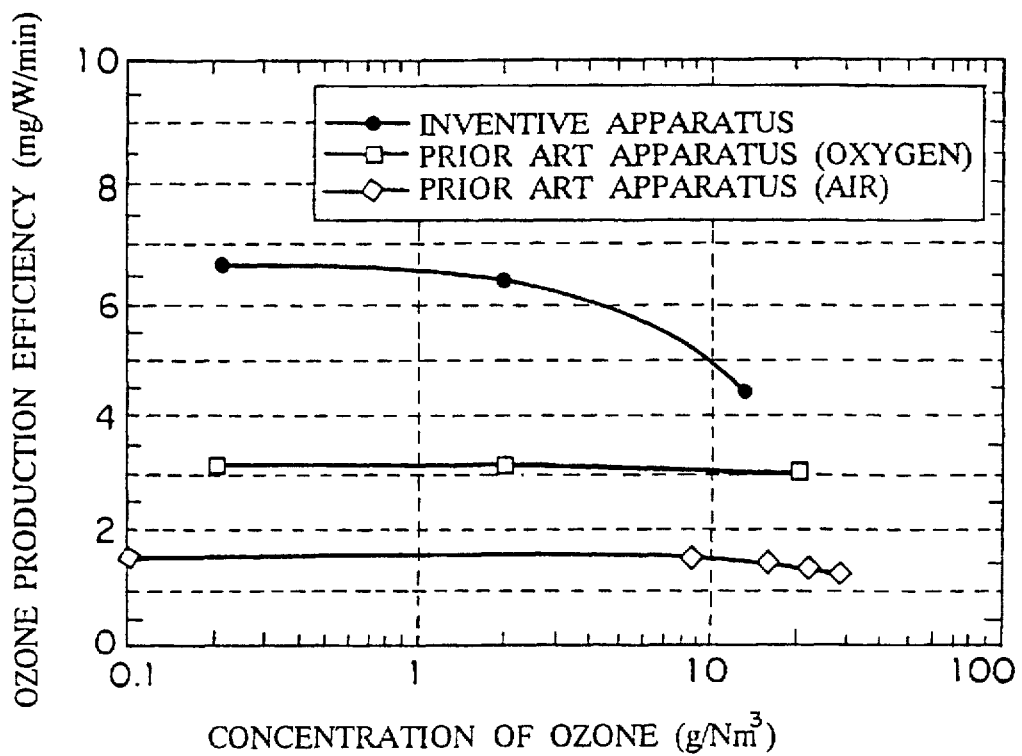
FIG. 6 is a graph showing a comparison in ozone production efficiency between the inventive ozone producing apparatus and a prior art silent discharge type ozone producing apparatus, which is based on a simulation result.

The similar simulation is performed by changing the concentration of oxygen atoms in a gas after mixture. The results are shown in FIG. 6. This graph shows a comparison in ozone production efficiency between the invention apparatus and the prior art apparatus, in which the abscissa indicates the concentration of ozone. In addition, the ozone production efficiency of the prior art apparatus is experimentally obtained by operating the recent cylinder shaped silent discharge type ozone producing apparatus using air (pure oxygen) as a source gas in a standard operation condition.

The result of simulating the operation of the inventive apparatus thus reveals that the inventive apparatus can produce ozone at a high ozone production efficiency, particularly, in a low ozone concentration region, as compared with the prior art apparatus.

The simulation result also reveals that even the inventive apparatus using air as a reaction gas can produce ozone at an ozone production efficiency higher than that obtained in the prior art apparatus using pure oxygen as a source gas.

The present invention, therefore, is different from the prior art apparatus in that oxygen atoms and ozone are not simultaneously produced in an electric discharge field, and is so configured that an oxygen atom production chamber is separated from an ozone production chamber for independently controlling optimum conditions required for production of oxygen atoms and ozone.

Hereinafter, the embodiment of the present invention will be described. FIG. 7A shows the schematic configuration of an ozone producing apparatus according to the present invention.

The apparatus has a feature including a low pressure feeding means for reducing a pressure of a gas containing oxygen atoms produced in an oxygen atom production chamber and feeding the oxygen atom containing gas into an ozone production chamber in the pressure reduction state.

In FIG. 7A, reference-numeral 1 indicates an inlet for an oxygen containing gas; 8 indicates a source gas inlet; 6 indicates an oxygen atom producing device containing an electric discharge chamber 7 for producing oxygen atoms from an oxygen containing source gas supplied from a source gas inlet 8. Reference numeral 71 indicates a mixture chamber for mixing a gas containing oxygen atoms and a reaction gas; 72 indicates a reaction gas introducing chamber for introducing a reaction gas into the mixture chamber 71; and 73 indicates a pressurizer such as a compressor, a blower or the like for pressurizing a mixture gas and introducing the mixture gas into an ozone production chamber 74. The pressurizer 73 also functions as the low pressure feeding means for reducing a pressure of a gas containing oxygen atoms produced in the oxygen atom production chamber 74.

The operation of the ozone producing apparatus in this embodiment will be described. A gas from the mixture chamber 71 is pressurized by the pressurizer such as a compressor, a blower or the like. As a result, the pressure of the mixture chamber 71 and the electric discharge chamber 7 in the oxygen atom producing device 6 is reduced to a value not more than atmospheric pressure, more concretely, in a range of from several Torr to several hundred Torr. In such a low pressure state, the following reaction occurs in the electric discharge chamber 7 to which an oxygen containing gas is supplied from the source gas inlet 8.

$$O_2 + e \rightarrow O + O + e \tag{1}$$

Oxygen atoms O are thus produced. In the above reaction formula, character "e" indicates an electron. The oxygen atoms O produced in the formula (1) are converted into ozone by the following reaction.

$$O + O_2 + M \rightarrow O_3 + M \tag{2}$$

Alternatively, the oxygen atoms O are returned into oxygen molecules, that is, extinguished by the following reaction.

$$O + O + M \rightarrow O_2 + M \tag{3}$$

In the above formulas (2), (3), character "M" indicates a third substance.

Each of the formulas (2), (3) is the so-called three body collision reaction in which the reaction proceeds in proportion to a square of the pressure, so that the reaction in each of the formulas (2), (3) is very slow in a low pressure electric discharge field. Here, when the concentration of $O_2$ is sufficiently higher than that of O, the ozone production reaction expressed by the formula (2) becomes dominant and the reaction expressed by the formula (3) is negligible.

Accordingly, when electric discharge is performed at a low pressure as in the apparatus in this embodiment, oxygen atoms produced by the formula (1) are little extinguished by the formulas (2), (3), so that oxygen atoms can be obtained at a high electric efficiency (number of produced oxygen atoms/power for electric discharge).

The oxygen atoms thus produced are introduced into the mixture chamber 71 while being kept at a low pressure, and mixed with an oxygen containing reaction gas in the mixture chamber 71. A mixture gas is pressurized by the pressurizer 73. In the ozone production chamber 74, the oxygen atoms react with oxygen contained in the reaction gas at a high pressure by the reaction expressed by the formula (2), to be efficiently converted into ozone.

In this way, in the ozone producing apparatus in this embodiment, since the oxygen atom production chamber as the oxygen atom producing device 6 is separated from the ozone production chamber 74, the conditions of the oxygen atom production chamber and the ozone production chamber can be independently set to be optimum for production of oxygen atoms and ozone. Namely, the oxygen atom production chamber can be set at a low pressure (several Torr to several hundred Torr) and at a high temperature, while the ozone production chamber can be set at a high pressure (about atmospheric pressure or more) and a low temperature (about 400K or less). As a result, it is possible to produce oxygen atoms and ozone at high efficiencies, respectively.

Since the oxygen atom production chamber can be heated at a high temperature without any problem, it is possible to eliminate the provision of the cooling mechanism and to apply a high density power. This is advantageous in realizing a simple and compact apparatus.

Additionally, since electric discharge is not generated in the ozone production chamber, it is possible to eliminate decomposition of ozone due to collision with electrons in the electric discharge field or decomposition of ozone due to $NO_x$ in the case of using air as a source gas in the prior art apparatus. This is advantageous in realizing an ozone producing apparatus having a very high ozone production efficiency.

FIG. 7B shows an apparatus has a feature including an ejector type low pressure feeding means for reducing a pressure of a gas containing oxygen atoms produced in an oxygen atom production chamber and feeding the oxygen atom containing gas into an ozone production chamber in the pressure reduction state.

In FIG. 7, reference numeral 1 indicates an inlet for an oxygen containing gas; 2 is a nozzle 2; 3 is a throat; 4 is a diffuser; and 5 is an outlet for an ozone containing gas. These are the basic components of the ejector. A gap 10 is provided between the nozzle 2 and the throat 3. Reference numeral 6 indicates an oxygen atom producing device containing an electric discharge chamber 7 for producing oxygen atoms from an oxygen containing source gas supplied from a source gas inlet 8. Reference numeral 9 indicates a pressure reduction chamber for feeding a gas containing oxygen atoms produced in the oxygen atom producing chamber 6 into the diffuser 4 in a state that the low pressure is kept. The pressure in the pressure reduction chamber 9 is kept at a value not more than atmospheric pressure, more concretely, in a range of from several Torr to several hundred Torr.

The operation of the ozone producing apparatus in this embodiment will be described. A pressurized reaction gas containing oxygen flows into the throat 3 through the nozzle 2. At this time, a gas present in the pressure reduction chamber 9 is entrapped into the throat 3 from the gap 10 provided between the nozzle 2 and the throat 3, so that the pressure of the pressure reduction chamber 9 and the electric discharge chamber 7 in the oxygen atom producing device 6 is reduced to a value not more than atmospheric pressure, more concretely, in a range of from several Torr to several hundred Torr. In such a low pressure state, the reaction indicated by the above formula (1) occurs in the electric discharge chamber 7 to which an oxygen containing gas is supplied from the source gas inlet 8.

The oxygen atoms thus produced are sucked from the pressure reduction chamber 9 into the gap 10 between the nozzle 2 and the throat 3 while being kept at a low pressure, and mixed with an oxygen containing reaction gas flowing from the nozzle in the throat 3 and in the diffuser 4. The oxygen atoms react with oxygen contained in the reaction gas at a high pressure by the reaction expressed by the formula (2), to be efficiently converted into ozone.

In this way, in the ozone producing apparatus shown in FIG. 7B, since the oxygen atom production chamber as the oxygen atom producing device 6 is separated from the ozone production chamber composed of the throat 3 and the diffuser 4, the conditions of the oxygen atom production chamber and the ozone production chamber can be independently set to be optimum for production of oxygen atoms and ozone. Namely, the oxygen atom production chamber can be set at a low pressure (several Torr to several hundred Torr) and at a high temperature, while the ozone production chamber can be set at a high pressure (about atmospheric pressure or more) and a low temperature (about 400K or less). As a result, it is possible to produce oxygen atoms and ozone at high efficiencies, respectively.

In case that it is difficult to control desired gas pressure and gas flow amount independently only by the ejector, it may be possible to use a pressurizer 75 such as a blower or the like in addition to the ejector. In such a case, by adjusting the pressurizer 75, the gas pressure and the gas flow amount can be controlled at desired values.

Embodiment 2

Figure 8:
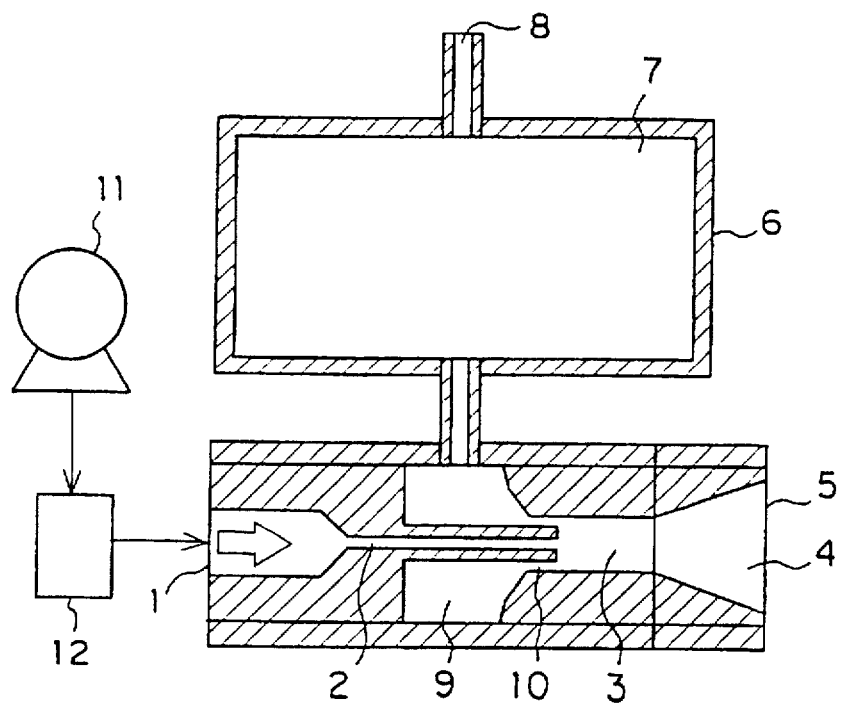
FIG. 8 is a schematic sectional view showing the configuration of an ozone producing apparatus according to a second embodiment of the present invention.

FIG. 8 shows a schematic configuration of an ozone producing apparatus according to a second embodiment of the present invention, which is basically the same as that of the ozone producing apparatus described in Embodiment 1.

In this figure, parts being the same as or similar to those shown in FIG. 7 are indicated by the same characters and the detailed explanation thereof is omitted.

The apparatus in this embodiment has a feature that air is used as an oxygen containing gas supplied from a reaction gas inlet 1.

The air to be supplied from the reaction gas inlet 1 is pressurized by a pressurizing means 11 such as a compressor or blower, and is then sufficiently dehumidified by an air drier 12.

The dried air thus obtained, like the apparatus shown in Embodiment 1, is supplied from the reaction gas inlet 1, flowing in the nozzle 2, and is mixed in the gap 10 with an oxygen atom containing gas sucked from a pressure reduction chamber 9, to be efficiently converted into ozone in a throat 3 and a diffuser 4 by the reaction expressed by the formula (2).

Like the apparatus in Embodiment 1, the apparatus in this embodiment is so configured that an oxygen atom production chamber is separated from an ozone production chamber for independently setting optimum conditions for producing oxygen atoms and ozone, and consequently it allows oxygen atoms and ozone to be produced at high efficiencies.

Since the oxygen atom production chamber can be heated at a high temperature without any problem, it is possible to apply a high density power and hence to realize a simple and compact apparatus. Moreover, since electric discharge is not generated in the ozone production chamber, it is possible to eliminate decomposition of ozone due to collision with electrons in the electric discharge field.

Additionally, although air is used as a reaction gas, it is not exposed to electric discharge, so that $NO_x$ is not generated, that is, decomposition of ozone due to $NO_x$ is not generated. This makes it possible to obtain an ozone production efficiency similar to that obtained in the case of using oxygen as a source gas.

Embodiment 3

Figure 9:
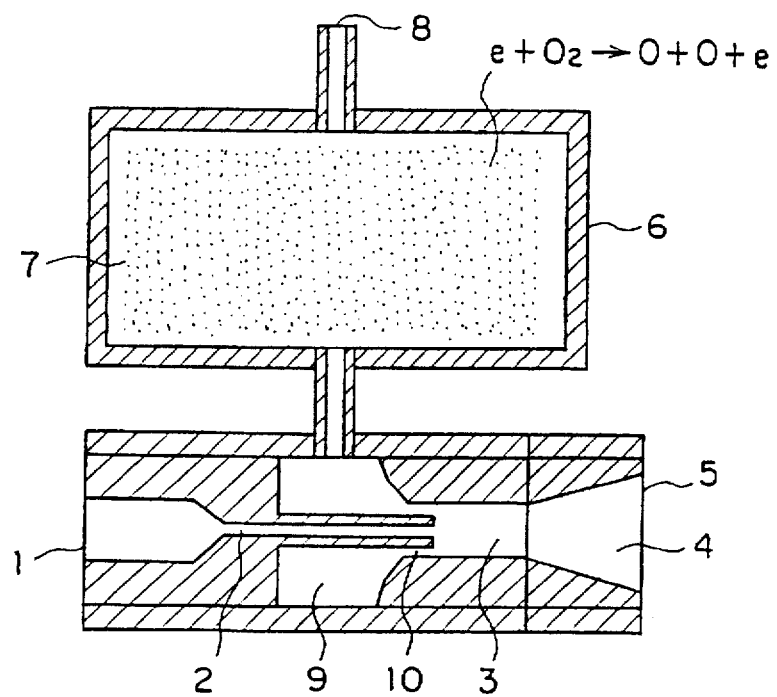
FIG. 9 is a schematic sectional view showing the configuration of an ozone producing apparatus according to a third embodiment of the present invention.

FIG. 9 shows a schematic configuration of an ozone producing apparatus according to a third embodiment of the present invention, which is basically the same as that of the ozone producing apparatus described in Embodiment 1.

In this figure, parts being the same as or similar to those described in Embodiment 1 or 2 are indicated by the same characters and the detailed explanation thereof is omitted.

The apparatus in this embodiment has a feature that non-equilibrium electric discharge is used as a means for producing oxygen atoms in an oxygen atom producing device 6.

Like the apparatuses in Embodiments 1, 2, the pressure in an electric discharge chamber contained in the oxygen atom producing device 6 is reduced to a value in a range of from several Torr to several hundred Torr by a low pressure feeding means using an ejector.

The frequency of collision between particles is small in the electric discharge at such a low pressure, so that an electron temperature Te and a gas temperature Tg in the electric discharge field are in a thermal non-equilibrium state, to thus realize a non-equilibrium electric discharge. The non-equilibrium electric discharge allows oxygen molecules to be dissociated at a low gas temperature. Consequently, it is possible to lower a gas temperature after oxygen atoms are mixed with a reaction gas, and hence to efficiently produce ozone.

The apparatus in this embodiment, which has the same basic configuration as those of the apparatuses described in Embodiments 1, 2, exhibits the same effect as those obtained in Embodiments 1, 2.

Moreover, since the non-equilibrium electric discharge is used as a means for producing oxygen atoms, it is possible to lower the gas temperature and hence to realize an apparatus capable of producing ozone at a high efficiency.

Embodiment 4

Figure 10:
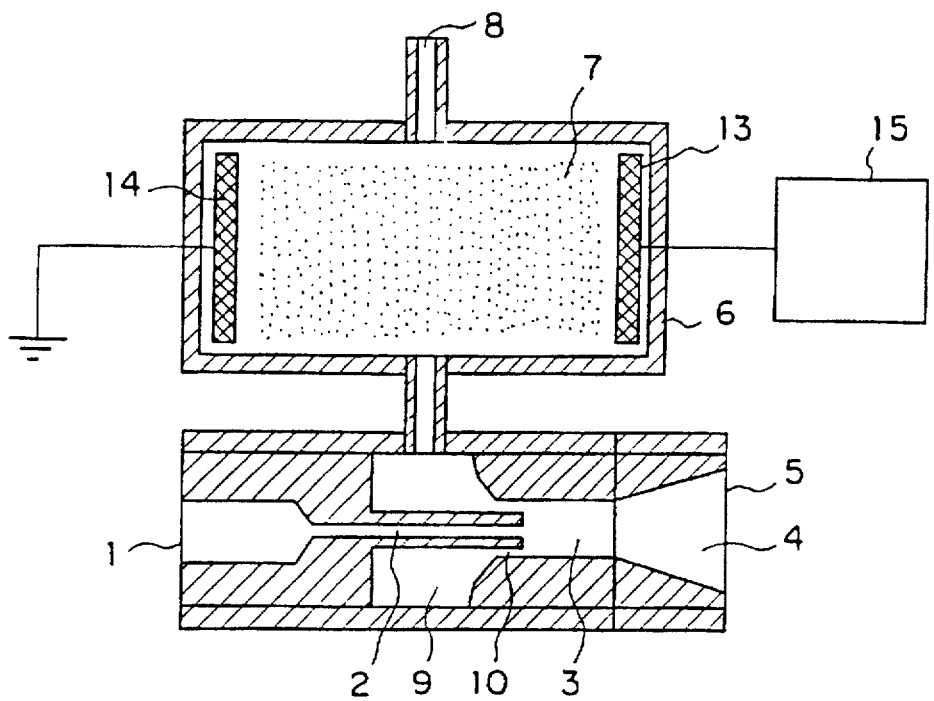
FIG. 10 is a schematic sectional view showing the configuration of an ozone producing apparatus according to a fourth embodiment of the present invention.

FIG. 10 shows a schematic configuration of an ozone producing apparatus according to a fourth embodiment of the present invention, which is basically the same as that of the ozone producing apparatus described in Embodiment 3.

In this figure, parts being the same as or similar to those described in Embodiment 3 are indicated by the same characters and the detailed explanation thereof is omitted.

The apparatus in this embodiment has a feature that glow discharge is used as means for producing oxygen atoms in an oxygen atom producing device 6.

Referring to FIG. 10, an anode electrode 13 and a cathode electrode 14 for generating glow discharge are disposed in an electric discharge chamber 7 reduced in pressure in a range of from several Torr to several hundred Torr by a low pressure feeding means using an ejector. In addition, reference numeral 15 indicates a power supply for generating electric discharge.

Electrons emitted from the cathode electrode 14 excite and dissociate oxygen molecules in glow discharge (positive column), to produce oxygen atoms. A plasma generated at a low pressure by non-equilibrium discharge is small in ionization degree. In particular, a plasma produced by glow discharge contains ions which are less in the number than electrons so that an energy imparted by an electric field in an electric discharge field is efficiently given to electrons.

Moreover, the reaction rate in each of the formulas (2), (3) is very low, and accordingly, the reaction rate of oxygen atoms produced by the reaction expressed by the formula (1) is very low in the reaction expressed by the formulas (2), (3). In other words, the oxygen atoms produced by the reaction expressed by the formula (1) are not extinguished by the reaction expressed by each of the formulas (2), (3). Oxygen atoms can be thus obtained at a high electric efficiency.

The oxygen atoms thus produced are sucked from a pressure reduction chamber 9 into a gap 10 between a nozzle 2 and a throat 3 while being kept at a low pressure, and react with oxygen in an oxygen containing reaction gas flowing from the nozzle by the reaction expressed by the formula (2) at a high pressure, to be thus efficiently converted into ozone.

The apparatus in this embodiment, having the same basic configuration as those of the apparatuses described in Embodiments 1 to 3, exhibits the same effect as those obtained in Embodiments 1 to 3.

Additionally, since glow discharge is used as non-equilibrium electric discharge for producing oxygen atoms in this embodiment, it is possible to make smaller the energy consumption of ions and produce oxygen atoms at a high electric efficiency, and hence to realize an apparatus capable of producing ozone at a high efficiency.

Embodiment 5

Figure 11:
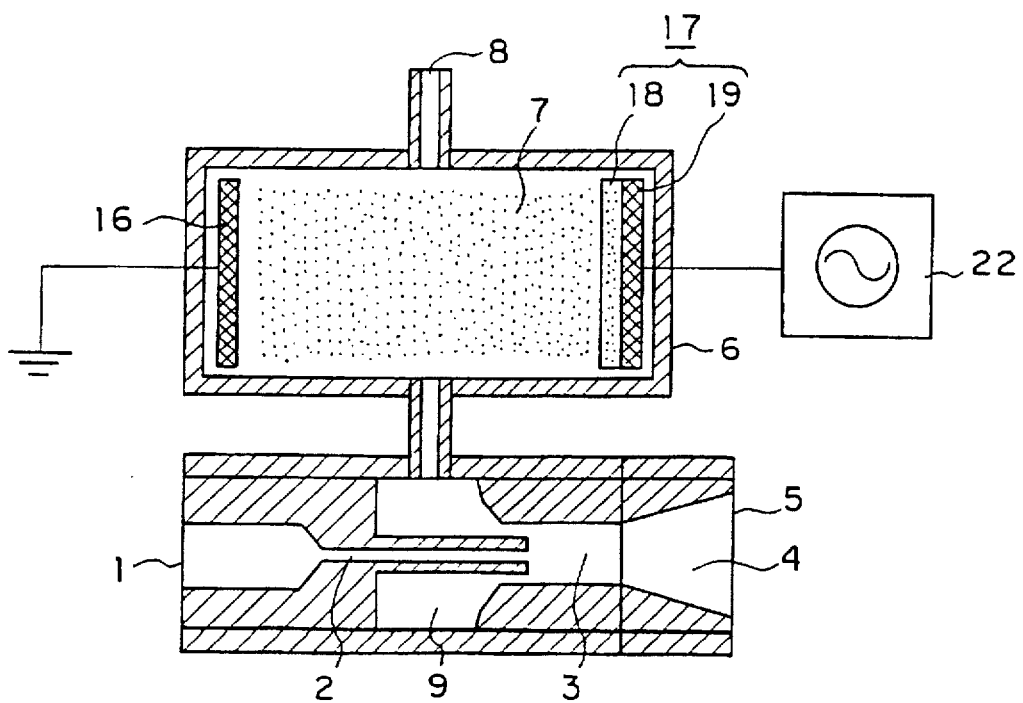
FIG. 11 is a schematic sectional view showing the configuration of an ozone producing apparatus according to a fifth embodiment of the present invention.

FIG. 11 shows a schematic configuration of an ozone producing apparatus according to a fifth embodiment of the present invention, which is basically the same as that in Embodiment 3.

In this figure, parts being the same as or similar to those described in Embodiment 3 are indicated by the same characters and the detailed explanation thereof is omitted.

The apparatus in this embodiment has a feature that silent discharge is used as a mean for producing oxygen atoms in an oxygen atom producing device 6.

Referring to FIG. 11, electrodes for generating silent discharge, that is, a grounding electrode 16 and a high voltage electrode 17 composed of a dielectric substance 18 and a metal electrode 19 are disposed in an electrode discharge chamber 7 reduced in pressure in a range of from several Torr to several hundred Torr by a low pressure feeding means. When a high voltage AC is applied from an AC power supply 22 between both the electrodes, silent discharge (or dielectric barrier discharge) is generated in the electric discharge chamber 7.

In the apparatus in this embodiment, electric discharge is generated at a low pressure like the apparatuses in Embodiments 1 to 4, so that oxygen atoms excited and dissociated by electrons are little extinguished, that is, oxygen atoms are produced at a high electric efficiency. Moreover, the oxygen atoms thus produced are converted into ozone at a high pressure in a different reaction chamber like the apparatuses in Embodiments 1 to 4, to thereby produce ozone at a very high efficiency.

The apparatus in this embodiment, having the same basic configuration as that of the apparatus described in Embodiment 3, exhibits the same effect as that obtained in Embodiment 3.

Embodiment 6

Figure 12A:
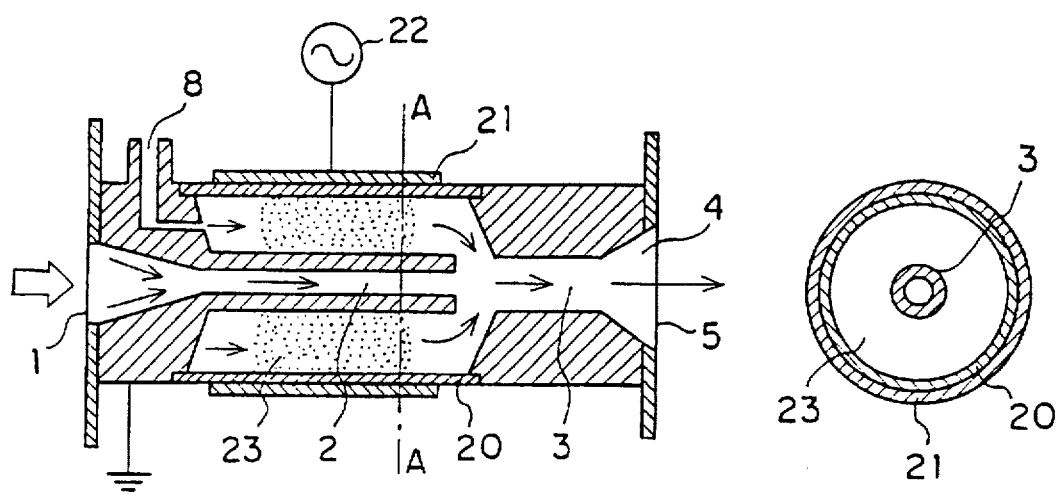
Figure 12B:
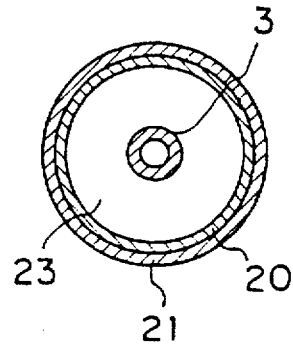

While the apparatus in Embodiment 5 is so configured that the oxygen atom producing device 6 is separated from the pressure reduction chamber 9, the oxygen atom producing device can be integrated with the pressure reduction chamber as shown in FIGS. 12A, 12B for reducing the size of the apparatus.

FIG. 12A is a vertical sectional view showing an essential portion of an ozone producing apparatus according to a sixth embodiment of the present invention; and FIG. 12B is a sectional view taken on line A—A of FIG. 12A.

In these figures, reference numeral 1 indicates an inlet for an oxygen containing reaction gas; 2 is a nozzle; 3 is a throat; 4 is a diffuser; and 5 is an outlet for an ozone containing gas. These components form a low pressure feeding means (ejector).

In the apparatus in this embodiment, an oxygen atom producing device of a low pressure silent discharge type is integrated with the ejector as the low pressure feeding means. Reference numeral 20 indicates a dielectric pipe such as a glass pipe; 21 is an electric supply electrode; 22 is a high voltage AC power supply; 8 is an inlet for an oxygen containing source gas; and 23 is an electric discharge field. These components form the oxygen atom generator.

The apparatus in this embodiment is different from that in Embodiment 5 only in that the oxygen atom producing device is integrated with the pressure reduction chamber, and is the same in the operating principle as that in Embodiment 5. Namely, a source gas containing oxygen atoms produced in the electric discharge field reduced in pressure by the ejector in a range of from several Torr to several hundred Torr is cooled by and mixed with a reaction gas supplied from the reaction gas inlet 1, to be efficiently converted into ozone at a high pressure.

The apparatus having the above configuration exhibits the same performance as that of the apparatus in Embodiment 5, and it can be made compact because the oxygen atom producing device is integrated with the ejector.

Embodiment 7

Figure 13:
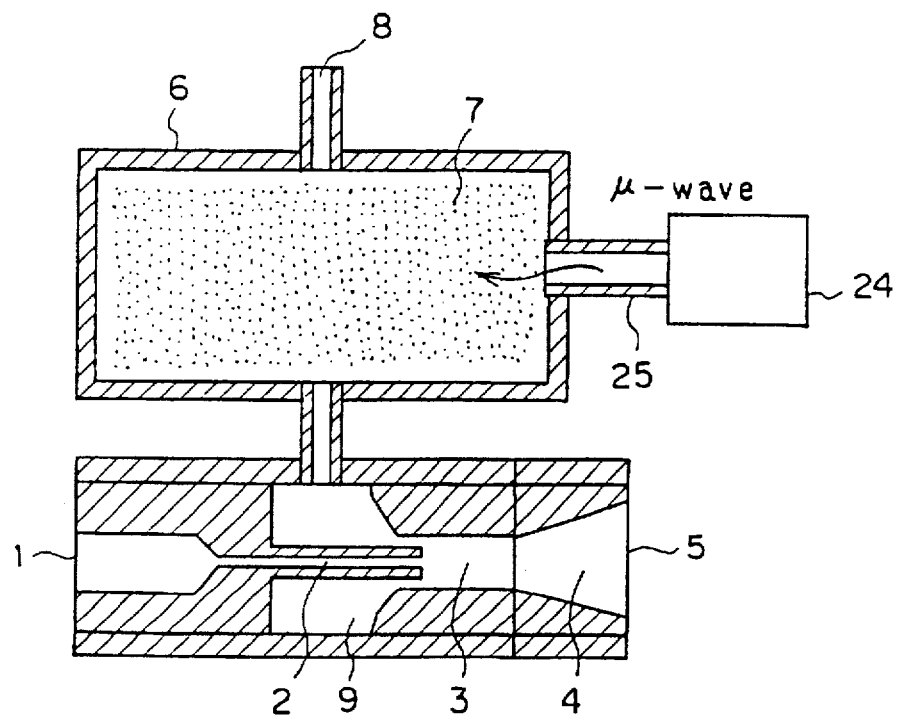
FIG. 13 is a schematic sectional view showing the configuration of an ozone producing apparatus according to a seventh embodiment of the present invention.

FIG. 13 shows a schematic configuration of an ozone producing apparatus according to a seventh embodiment of the present invention, which is basically the same as that in Embodiment 3.

In this figure, parts being the same as or similar to those described in Embodiment 3 are indicated by the same characters and the detailed explanation thereof is omitted.

The apparatus in this embodiment has a feature that microwave discharge is used as a means for producing oxygen atoms in an oxygen atom producing device 6.

Referring to FIG. 13, a microwave generated by a microwave producing device 24 such as a magnetron is introduced into the oxygen atom producing device 6 by way of a wave guide 25 for generating electric discharge in an electric discharge chamber 7 by the electric field of the microwave. In the apparatus in this embodiment, electric discharge is generated at a low pressure as in the apparatuses in Embodiments 1 to 6, so that the energy is efficiently injected from the electric field of the microwave into electrons.

As a result, oxygen atoms can be obtained at a high electric efficiency. In order to enhance the density of electrons, the electric discharge chamber 7 may be formed to function as a resonator for generating a standing-microwave in the electric discharge chamber 7 so as to increase the electric field strength of the microwave.

The apparatus in this embodiment, which is so configured that oxygen atoms thus produced are converted into ozone at a high pressure in a different reaction chamber as in the previous embodiments, can produce ozone at a very high efficiency.

The apparatus in this embodiment, having the same basic configuration as that of the apparatus described in Embodiment 3, exhibits the same effect as that obtained in Embodiment 3.

Embodiment 8

Figure 14:
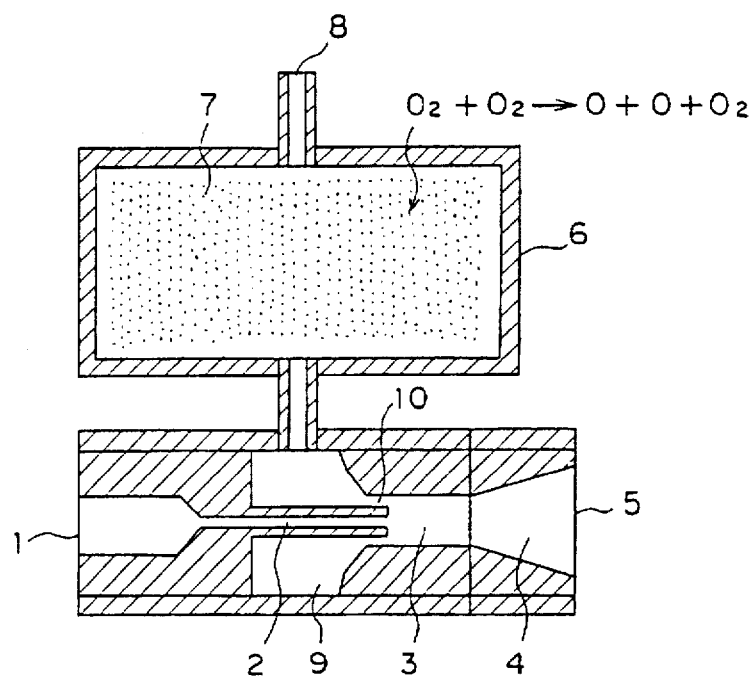
FIG. 14 is a schematic sectional view showing the configuration of an ozone producing apparatus according to an eighth embodiment of the present invention.

FIG. 14 shows a schematic configuration of an ozone producing apparatus according to an eighth embodiment of the present invention, which is basically the same as that in Embodiment 1.

In this figure, parts being the same as or similar to those described in Embodiment 1 are indicated by the same characters and the detailed explanation thereof is omitted.

The apparatus in this embodiment has a feature that thermal plasma is used as a means for producing oxygen atoms in an oxygen atom producing device 6.

The thermal dissociation reaction and the reversed reaction of oxygen atoms are expressed as follows:

$$O_2 + O_2 \rightarrow O + O + O_2$$

$$O + O + O_2 \rightarrow O_2 + O_2$$

$$O + O + O \rightarrow O_2 + O$$

Figure 15:
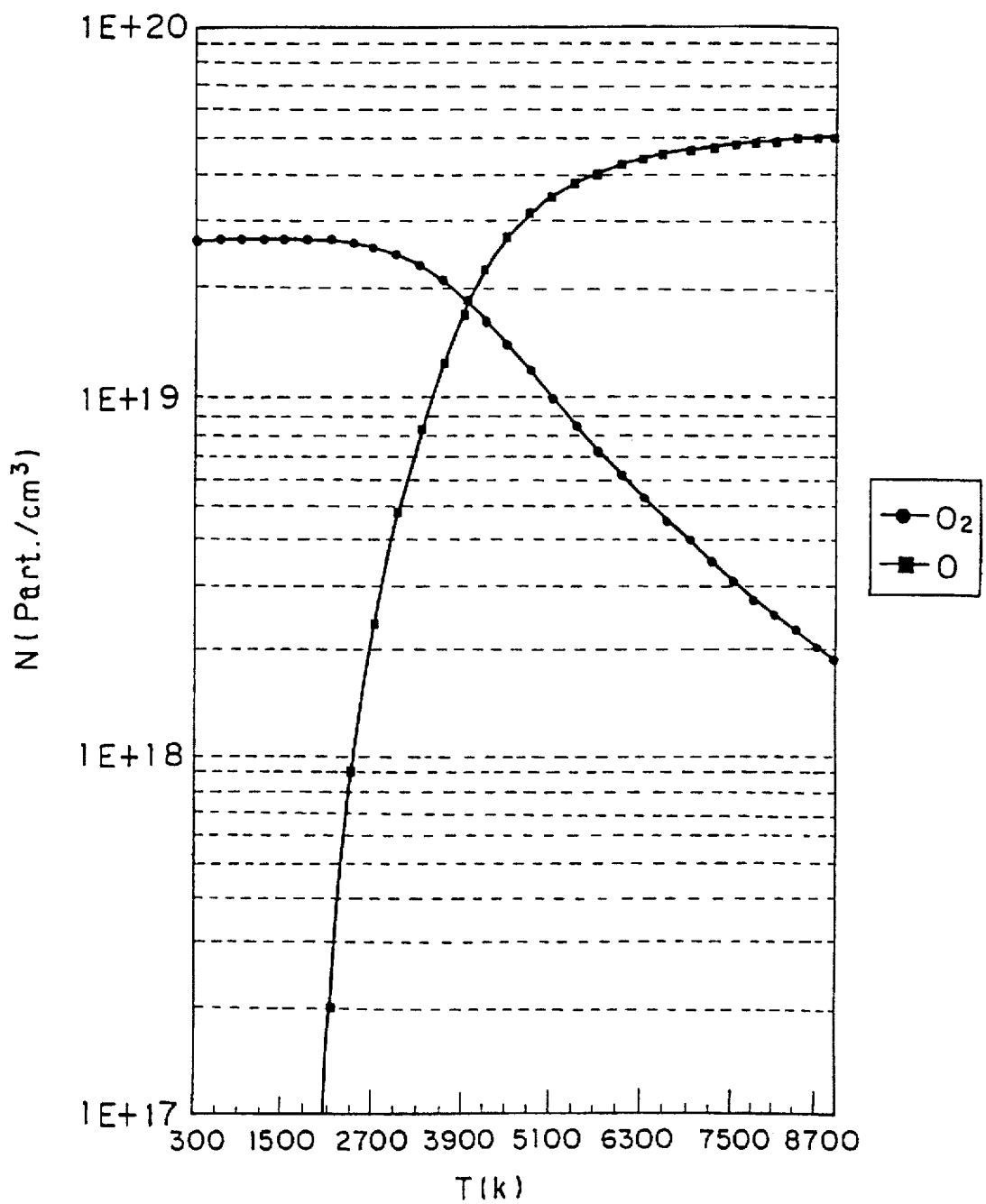
FIG. 15 is a graph showing changes in the numbers of particles of oxygen molecules and oxygen atoms depending on a gas temperature in a state in which an oxygen gas is dissociated at atmospheric pressure.

The temperature dependency on the distribution of $O_2$ and $O$ in a thermal equilibrium state is shown in FIG. 15.

It is apparent from this graph that in the case of dissociation of an oxygen gas $O_2$ using thermal plasma, the dissociation degree of oxygen atoms becomes larger with an increase in the temperature in an oxygen atom production chamber. For example, the dissociation degree of oxygen atoms reaches 50% at about 4000K.

The required energy for production of oxygen atoms O by thermal dissociation of an oxygen gas $O_2$ can be obtained on the basis of the concentration [O] of oxygen atoms being in an equilibrium state at a gas temperature $T_1$ and the required energy (differential enthalpy) for heating the entire gas to the temperature $T_1$.

Figure 16:
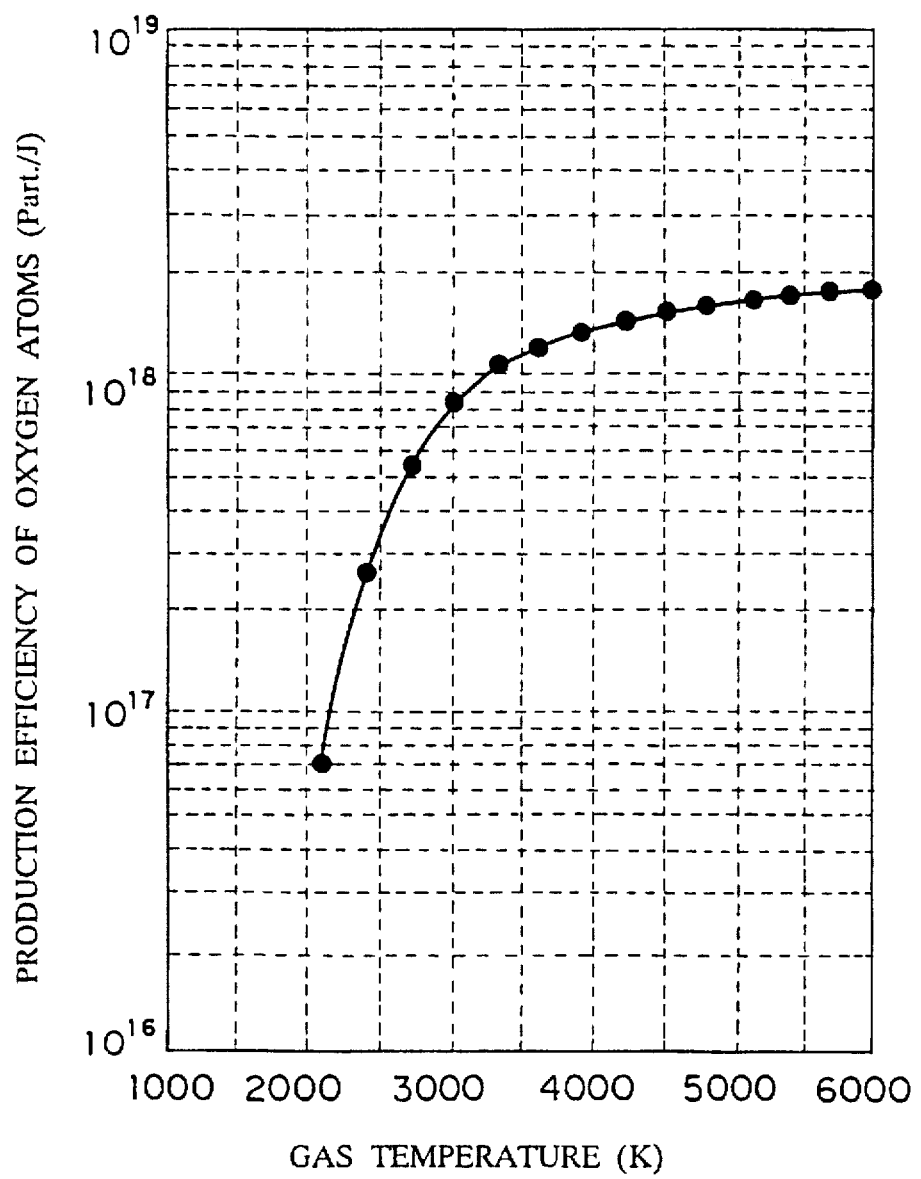
FIG. 16 is a graph showing a production efficiency of oxygen atoms produced by thermal dissociation at atmospheric pressure.

FIG. 16 shows a gas temperature dependency on the required energy (the generated number of oxygen atoms per joule) for production of oxygen atoms in the case of thermal dissociation at atmospheric pressure, which is obtained on the basis of the concentration of oxygen atoms and the enthalpy of the oxygen gas shown in FIG. 15.

It is apparent from this graph that when an oxygen gas is thermally dissociated at a high temperature of 3000K or more using thermal plasma, oxygen atoms can be produced at a high energy efficiency which is substantially equal to that in the case of the non-equilibrium electric discharge shown in FIG. 4.

A source gas containing oxygen atoms is sucked in a gap 10 between a nozzle 2 and a throat 3 by way of a pressure reduction chamber 9 while being kept at a low pressure, and is mixed with an oxygen containing reaction gas flowing in the nozzle, to be efficiently converted into ozone at a high pressure by the reaction with oxygen contained in the reaction gas in accordance with the reaction formula (2).

Oxygen atoms produced by thermal plasma can be of course converted into ozone similarly to oxygen atoms produced by non-equilibrium electric discharge in the same condition after the cooled quenching.

Figure 17:
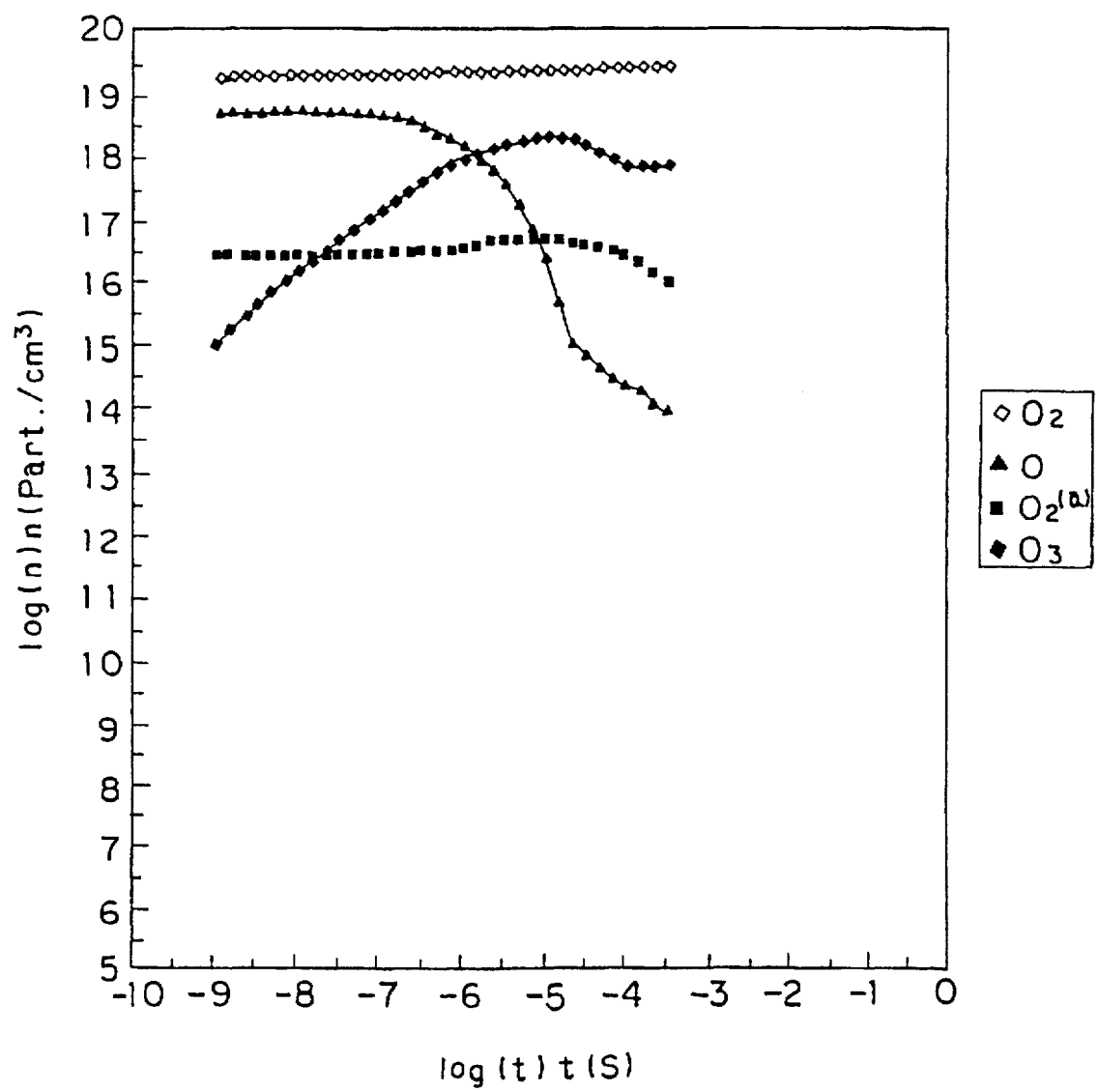
FIG. 17 is a graph showing a result of simulating a conversion step in which a source gas subjected to thermal equilibrium dissociation at atmospheric pressure is converted into ozone by cooled quenching.

The results of simulating the step of producing ozone in the case where thermal plasma containing oxygen atoms is directly subjected to cooled quenching is shown in FIG. 17.

FIG. 17 shows changes in numbers of particles of O, $O_2$ and $O_3$ with time in the step of production of ozone when pure oxygen is made in a disassociation equilibrium state at atmospheric pressure and at 3000K and then rapidly cooled stepwise in three stages of 2100K (kept for 1 μs), 1200K (kept for 1 μs) and 300K.

In this case, oxygen atoms having a volume ratio of 27.2% is produced, and 9.9% of the oxygen atoms is converted into ozone. Finally, oxygen which contains ozone in a volume ratio of 2.69% is obtained.

The gas containing oxygen atoms is then mixed with and cooled by the reaction gas. The conversion from oxygen atoms into ozone is completed after $10^{-5}$ s. Accordingly, it becomes apparent that the quenching time required for efficient conversion from oxygen atoms to ozone is in the order of micro seconds at atmospheric pressure, and rapid cooling is required for mixing oxygen atoms with the reaction gas.

In this embodiment in which oxygen atoms are produced by dissociation using thermal plasma, the dissociation degree of an oxygen gas is increased for enhancing the energy efficiency for production of oxygen atoms and the oxygen atoms are introduced to the mixing point at a high temperature and at a low pressure for preventing re-combination of the oxygen atoms until mixing with the reaction gas.

The gas containing oxygen atoms thus introduced is mixed with a reaction gas (for example, an air at a low temperature or an oxygen containing gas at a low temperature) sucked by the ejector. The mixed gas is thus rapidly cooled, to produce ozone at a high energy efficiency similar to that in the ozone producing apparatus of a type in which oxygen atoms are produced by non-equilibrium electric discharge.

The particle density of thermal plasma is in the order of from 1/1,000 to 1/10,000 of the particle density of the reaction gas (for example, air) to be mixed. In other words, thermal plasma is very small in heat capacity, and accordingly, the mixed gas of the thermal plasma containing oxygen atoms and the reaction gas is rapidly cooled only by mixing with the reaction gas sufficiently cooled. The reaction gas can be cooled by the known method using a refrigerator, liquid nitrogen or the like.

This embodiment has the same configuration as that of Embodiment 1, except that thermal plasma is used as the oxygen atom producing means. Accordingly, if the oxygen atom producing device 6 has a large capacity capable of neglecting the thermal loss, the apparatus in this embodiment can produce ozone at a high efficiency with a simple and compact configuration, like the apparatuses in Embodiments 1 to 7.

Embodiment 9

Figure 18:
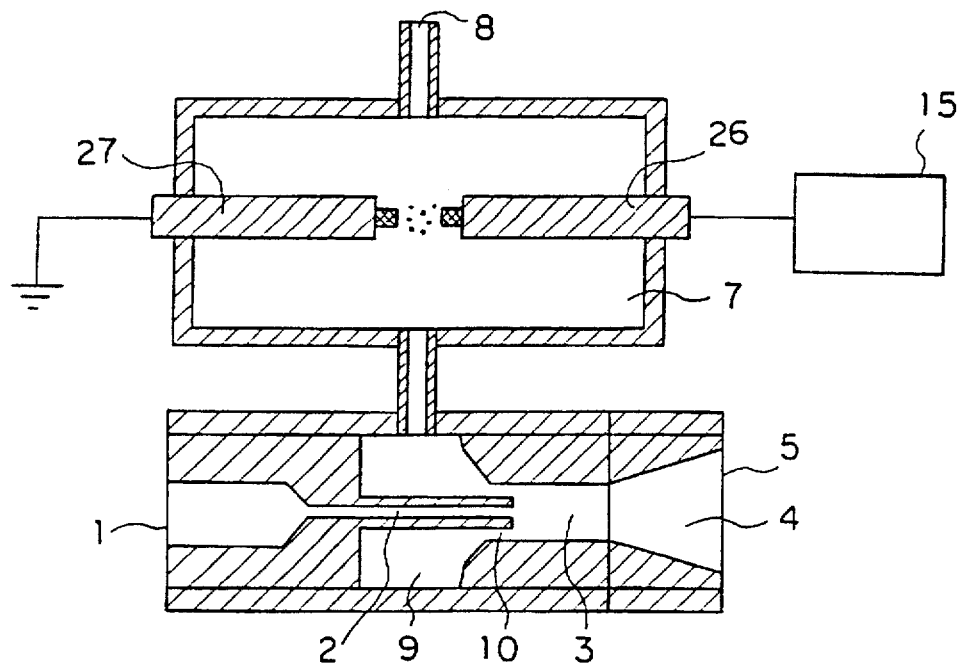
FIG. 18 is a schematic sectional view showing the configuration of an ozone producing apparatus according to a ninth embodiment of the present invention.

FIG. 18 shows a schematic configuration of an ozone producing apparatus according to a ninth embodiment of the present invention, which is basically the same as that in Embodiment 7.

In this figure, parts being the same as or similar to those described in Embodiment 7 are indicated by the same characters and the detailed explanation thereof is omitted.

The apparatus in this embodiment has a feature that arc discharge is used as the means for generating thermal plasma in the ozone producing apparatus including the oxygen atom producing device using thermal plasma in Embodiment 8.

In FIG. 18, reference numerals 26, 27 indicate electrodes for generating arc discharge in an electric discharge chamber 6. In this case, like the apparatus in Embodiment 8, the electric discharge chamber 7 is reduced in pressure in a range of atmospheric pressure or less by a low pressure feeding means (including components shown by reference numerals 1, 2, 3, 4, 5, 9 and 10) of an ejector type. The pressure in the electric discharge chamber 7, however, is set to be higher than that of the electric discharge chamber in each apparatus of Embodiments 3 to 6 using non-equilibrium electric discharge for producing oxygen atoms, for example, at a value in a range of from 100 Torr to several hundred Torr.

The collision frequency between particles is increased in such a pressure, so that an electron temperature Te is nearly equal to a gas temperature Tg in an electric discharge field. This temperature (Te, Tg) reaches about several thousand temperature, to thus realize thermal equilibrium plasma.

When the gas temperature is more than 4000K, the energy efficiency for production oxygen atoms is substantially equal to that in the case of producing oxygen atoms using non-equilibrium electric discharge as shown in FIG. 16. As a result, the apparatus in this embodiment can exhibit the same effect as that obtained by the apparatus in Embodiment 7.

Embodiment 10

Figure 19:
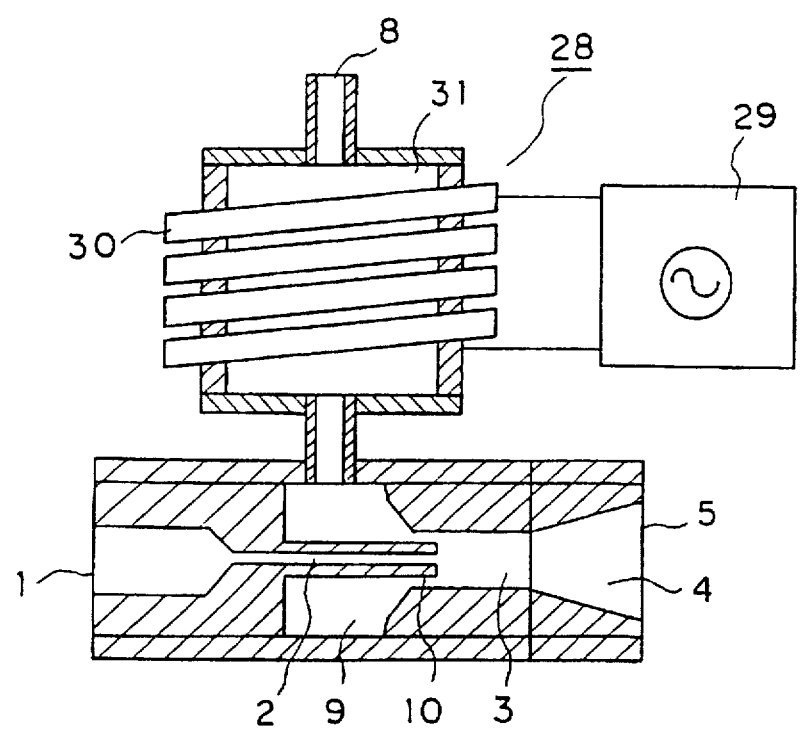
FIG. 19 is a schematic sectional view showing the configuration of an ozone producing apparatus according to a tenth embodiment of the present invention.

FIG. 19 shows a schematic configuration of an ozone producing apparatus according to a tenth embodiment of the present invention, which is basically the same as that in Embodiment 7.

In this figure, parts being the same as or similar to those described in Embodiment 7 are indicated by the same characters and the detailed explanation thereof is omitted.

The apparatus in this embodiment has a feature that high frequency discharge is used as the means for generating thermal plasma in the ozone producing apparatus including the oxygen atom producing device using thermal plasma in Embodiment 8.

In FIG. 19, reference numeral 28 indicates a high frequency plasma producing device composed of a high frequency power supply 29, an induction heating coil 30, and an electric discharge chamber 31 made of a high melting point material such as ceramic, which is adapted to thermally dissociate an oxygen containing source gas introduced through a source gas inlet 8 by high frequency induction heating for producing oxygen atoms.

Like the previous embodiments, the plasma producing device is connected to a pressure reduction chamber 9 reduced in pressure to a value less than atmospheric pressure by a low pressure feeding means. The pressure in the pressure reduction chamber 9 is set to be higher than that of the pressure reduction chamber in each of Embodiments 3 to 6 using non-equilibrium electric discharge for producing oxygen atoms, for example, at a value in a range of 100 Torr to several hundred Torr. The collision frequency between particles is increased in such a pressure, so that an electron temperature Te is nearly equal to a gas temperature Tg in an electric discharge field. This temperature (Te, Tg) reaches about several thousand temperature, to thus realize thermal equilibrium plasma.

When the gas temperature is more than 4000K, the energy efficiency for production oxygen atoms is substantially equal to that in the case of producing oxygen atoms using non-equilibrium electric discharge as shown in FIG. 16. As a result, the apparatus in this embodiment can exhibit the same effect as that obtained by the apparatus in Embodiment 7.

Embodiment 11

Figure 20:
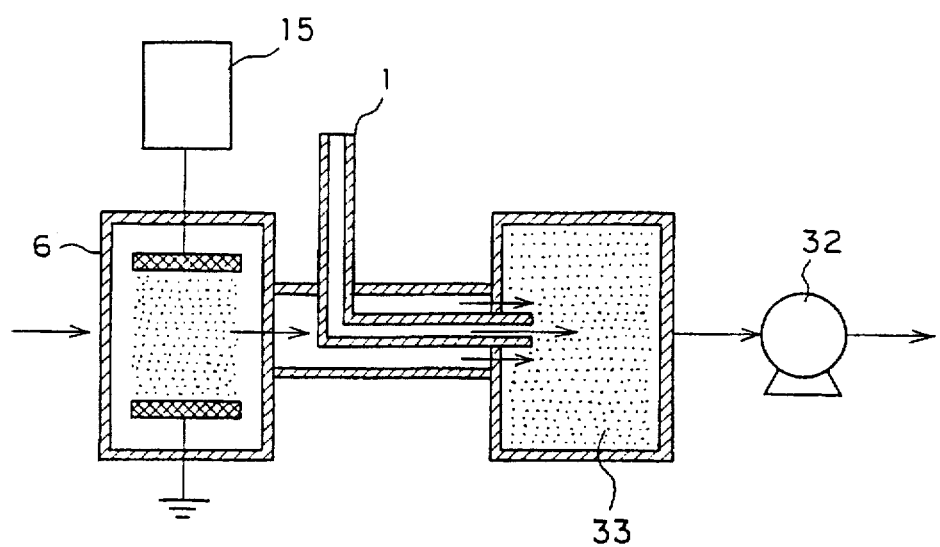
FIG. 20 is a schematic sectional view showing the configuration of an ozone producing apparatus according to an eleventh embodiment of the present invention.

While each of the apparatuses in Embodiments 1 to 10 uses the ejector type low pressure feeding means, an ozone producing apparatus in an eleventh embodiment shown in FIG. 20 uses a pressure reduction pump 32 as the low pressure feeding means.

The apparatus in this embodiment uses glow discharge as an oxygen atom producing device; however, any of the discharge types in Embodiments 1 to 3, and 5 to 10 may be used as the oxygen atom producing device.

A source gas containing oxygen atoms produced by non-equilibrium electric discharge or thermal plasma in an oxygen atom producing device 6 reduced in pressure to a specified value less than atmospheric pressure by the pressure reduction pump 32 is introduced to a gas mixing chamber 33 provided between the pump 32 and the oxygen atom producing device 6. At the same time, an oxygen containing reaction gas is introduced to the gas mixing chamber 33 from a reaction gas inlet 8 for increasing the concentration of oxygen ($O_2$) to a value sufficiently higher than that of oxygen atoms (O).

The reaction gas is mixed with the oxygen atom containing gas sucked from the oxygen atom producing device at a low pressure. The mixed gas is sucked by the pressure reduction pump 32, and is increased in its pressure to about atmospheric pressure on the downstream side thereof, to be converted into ozone by the reaction expressed by the reaction formula (2). In this case, since the concentration of oxygen ($O_2$) is set to be sufficiently higher than that of oxygen atoms (O) in the gas mixing chamber 33, it is possible to produce ozone at a high efficiency.

The apparatus in this embodiment, having the same configuration as that of each apparatus in Embodiments 1 to 10, can exhibit the same effect as that of each apparatus in Embodiments 1 to 10.

Embodiment 12

Figure 21:
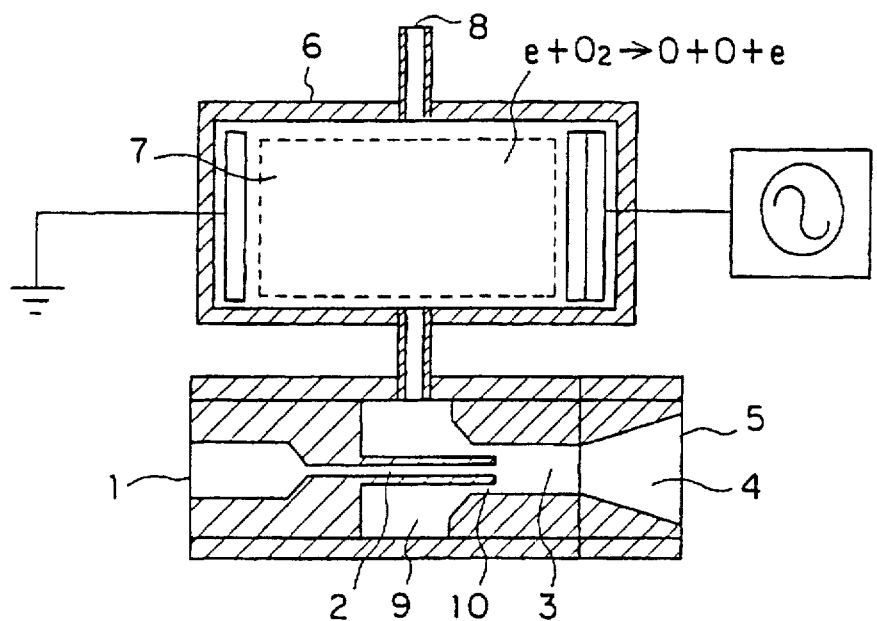
FIG. 21 is an example of the configuration of the ozone producing apparatus according to the first embodiment shown in FIG. 7.

FIG. 21 shows one example of the configuration of the ozone producing apparatus in Embodiment 1. Unlike the prior art apparatus shown in FIG. 31, this example is not configured that oxygen atoms and ozone are simultaneously produced, but is configured that an oxygen atom production chamber is separated from an ozone production chamber for independently controlling oxygen atoms and ozone at optimum conditions as described in Embodiment 1. The apparatus in this embodiment uses an ejector as a means for reducing the pressure of a gas containing oxygen atoms produced in an oxygen atom producing chamber and feeding the oxygen atom containing gas into an ozone producing chamber in the pressure reduction state.

In FIG. 21, reference numeral 1 indicates an inlet for an oxygen containing gas; 2 is a nozzle 2; 3 is a throat; 4 is a diffuser; and 5 is an outlet for an ozone containing gas. These are the basic components of the ejector. A gap 10 is provided between the nozzle 2 and the throat 3. Reference numeral 6 indicates an oxygen atom producing device containing an electric discharge chamber 7 for producing oxygen atoms from an oxygen containing source gas supplied from a source gas inlet 8. Reference numeral 9 indicates a pressure reduction chamber for feeding a gas containing oxygen atoms produced in the oxygen atom producing chamber 6 into the diffuser 4 in a state that the low pressure is kept. The pressure in the pressure reduction chamber 9 is kept at a value not more than atmospheric pressure, more concretely, in a range of from several Torr to several hundred Torr.

The operation of the ozone producing apparatus in this example will be described. An oxygen atom containing reaction gas (for example, air), which is pressurized by a compressor or a blower, flows into the throat 3 through the nozzle 2. At this time, a gas present in the pressure reduction chamber 9 is entrapped into the throat 3 from the gap 10 provided between the nozzle 2 and the throat 3, so that the pressure of the pressure reduction chamber 9 and the electric discharge chamber 7 in the oxygen atom producing device 6 is reduced to a value not more than atmospheric pressure, more concretely, in a range of from several Torr to several hundred Torr.

In such a low pressure state, the following reaction occurs in the electric discharge chamber 7 to which an oxygen containing gas is supplied from the source gas inlet 8.

Oxygen atoms O are thus produced. In the above reaction formula, character "e" indicates an electron. The oxygen atoms O produced in the formula (1) are converted into ozone by the following reaction.

Alternatively, the oxygen atoms O are returned into oxygen molecules, that is, extinguished by the following reaction.

In the above formulas (2), (3), character "M" indicates a third substance.

Each of the formulas (2), (3) is the so-called three body collision reaction in which the reaction proceeds in proportion to a square of the pressure, so that the reaction in each of the formulas (2), (3) is very slow in a low pressure electric discharge field.

Here, when the concentration of $O_2$ is sufficiently higher than that of O, the ozone production reaction expressed by the formula (2) becomes dominant and the reaction expressed by the formula (3) is negligible.

Accordingly, when electric discharge is generated at a low pressure as in the apparatus in this example shown in FIG. 21, oxygen atoms produced by the formula (1) are little extinguished by the formulas (2), (3), so that oxygen atoms can be obtained at a high electric efficiency (number of produced oxygen atoms/power for electric discharge).

The oxygen atoms thus produced are sucked from the pressure reduction chamber 9 into the gap 10 between the nozzle 2 and the throat 3 while being kept at a low pressure, and mixed with an oxygen containing reaction gas (for example, air) flowing from the nozzle in the throat 3 and in the diffuser 4. The oxygen atoms react with oxygen contained in the reaction gas at a high pressure by the reaction expressed by the formula (2), to be efficiently converted into ozone.

Figure 22:
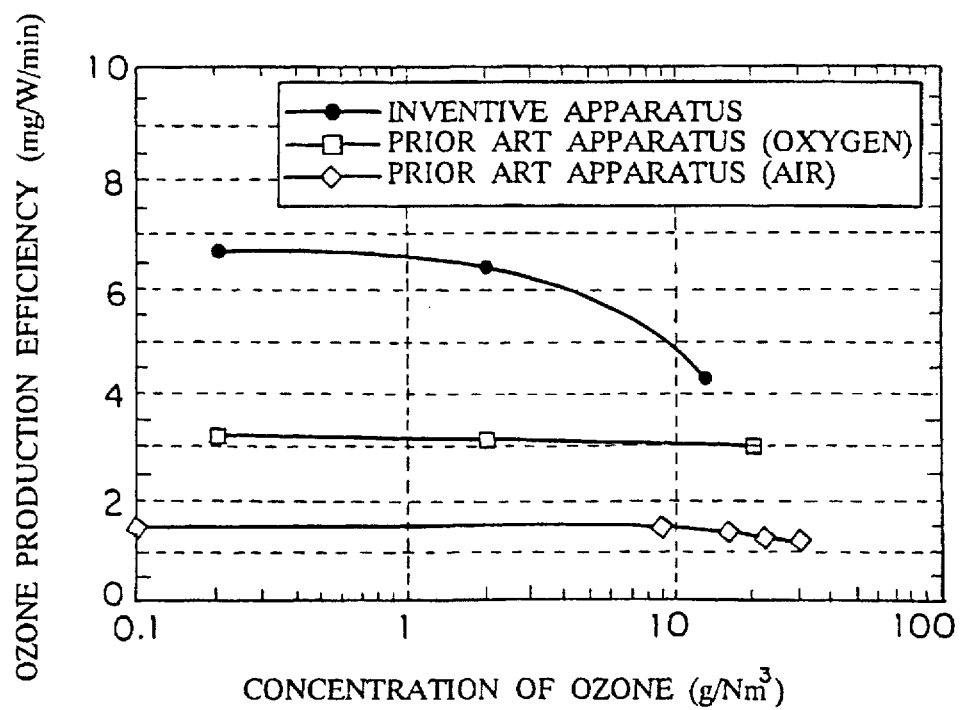
FIG. 22 is a graph showing a comparison in ozone production efficiency between the ozone producing apparatus shown in FIG. 21 and the prior art ozone producing apparatus, which is based on a simulation result.

In order to examine the effect of the apparatus in the example shown in FIG. 21, a simulation for the step of producing ozone is performed by changing the concentration of oxygen atoms in a mixed gas. FIG. 22 shows a relationship between an ozone production efficiency and the concentration of ozone, which is based on the above simulation.

Figure 31:
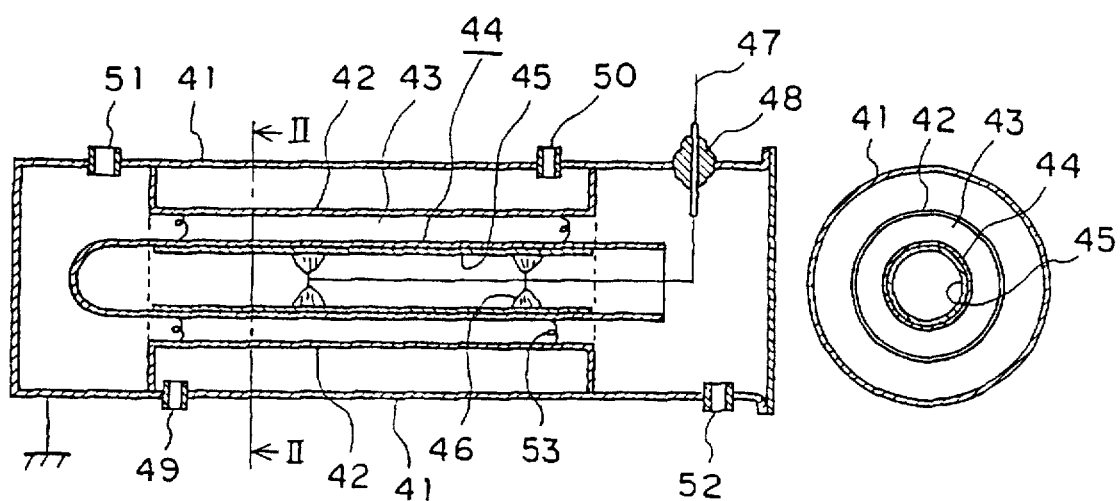
FIG. 31 is a schematic sectional view showing the configuration of a prior art silent discharge type ozone producing apparatus.

In this graph, with respect to the ozone production efficiency of the prior art ozone producing apparatus shown in FIG. 31, experimental values obtained by operation of the recent cylindrical silent discharge type ozone producing apparatus using air and pure oxygen as a source gas in a standard condition are plotted.

It is apparent from this graph that the apparatus having the configuration in which the oxygen atom production chamber is separated from the ozone production chamber for independently controlling oxygen atoms and ozone in optimum conditions can produce ozone at a higher ozone production efficiency, particularly, in a low ozone concentration region of 2-3 $g/Nm^3$ or less, as compared with the prior art apparatus in which oxygen atoms and ozone are simultaneously produced in the electric discharge field.

The apparatus shown in FIG. 21, however, is inconvenient that the ozone production efficiency becomes lower with an increase in the concentration of the produced ozone, as seen from FIG. 22.

Figure 23:
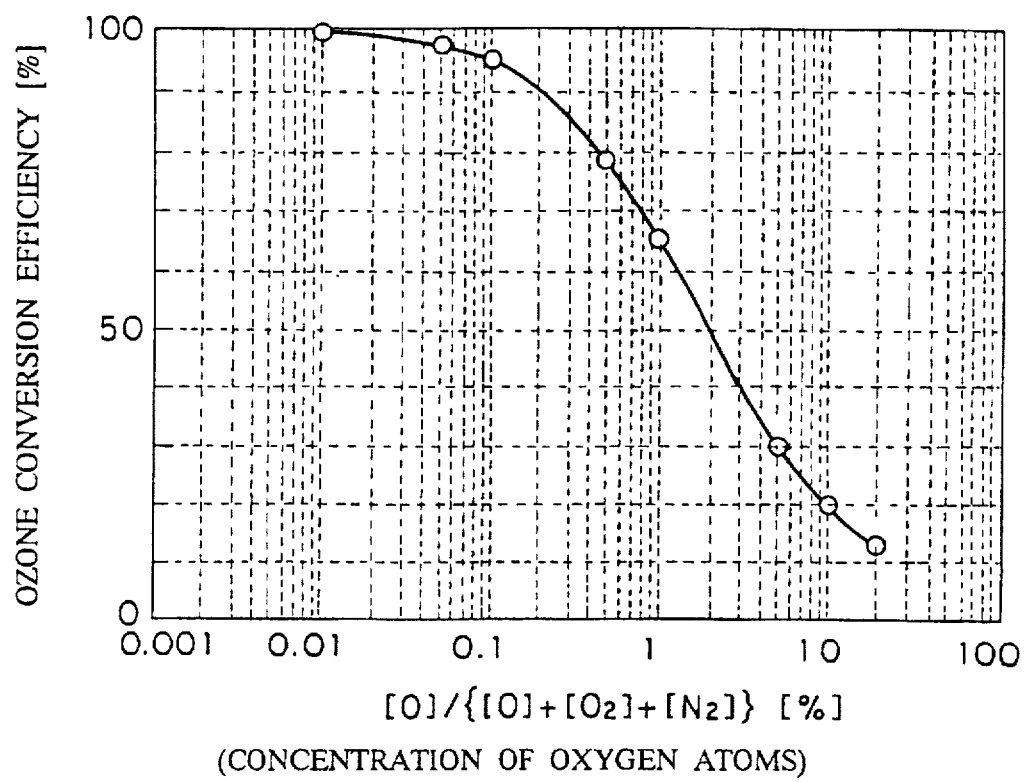
FIG. 23 is a graph showing a relationship between a concentration of oxygen atoms added to a reaction gas and an ozone conversion efficiency.

FIG. 23 shows an ozone producing step using the apparatus shown in FIG. 21, in which oxygen atoms produced by electric discharge are mixed with air in a state at atmospheric pressure and at 350K to be converted into ozone. In this graph, the ordinates indicates a conversion ratio of oxygen atoms finally converted into ozone (number of produced ozone molecules/number of initial oxygen atoms, that is, ozone conversion efficiency), and the abscissa indicates the concentration of oxygen atoms injected in the ozone production chamber and mixed with a reaction gas.

From FIG. 23, the conversion ratio of oxygen atoms finally converted into ozone becomes 99%, 95%, 64%, 20%, and 13% when the injected concentration of oxygen atoms is selected at 0.01%, 0.1%, 1%, 10%, and 20%. As a result, it becomes apparent that the conversion efficiency from oxygen atoms into ozone is significantly decreased with an increase in the concentration of oxygen atoms.

This is because the rate of the oxygen atom re-combination reaction expressed by the reaction formula (3) is made larger with an increase in the concentration of oxygen atoms to return the oxygen atoms produced by electric discharge into oxygen molecules.

Accordingly, to efficiently convert the produced oxygen atoms into ozone, it is required to suppress the concentration of the oxygen atoms to be mixed with a reaction gas.

As described above, in the apparatus shown in FIG. 21 in which the oxygen atom production chamber is separated from the ozone production chamber for improving the disadvantages of the prior art apparatus shown in FIG. 31, ozone can be produced at a high efficiency because ozone and $NO_x$ are not present in an electric discharge field and thereby the decomposition of ozone due to the collision with electrons and reaction with $NO_x$ is not generated; however, such a high ozone conversion efficiency can be obtained only in the case in which the concentration of oxygen atoms mixed with a reaction gas such as air in the ozone production chamber is low.

When the concentration of oxygen atoms mixed with a reaction gas is increased, the oxygen atom re-combination reaction expressed by the reaction formula (3) is dominated to significantly reduce the ozone conversion efficiency. As a result, in a region in which the concentration of the produced ozone is high, the energy efficiency for producing ozone is lowered.

To cope with such an inconvenience, according to the present invention, the oxygen atom production chamber is separated from the ozone production chamber, and the oxygen atoms produced in the oxygen atom production chamber are divided and repeatedly added in a specified low concentration into a reaction gas in the ozone production chamber, to thereby produce ozone in a high concentration at a high efficiency.

The main reaction and the reversed reaction in conversion from oxygen atoms produced by electric discharge into ozone are as shown in the above reaction formulas (2), (3).

Assuming that reaction rate constants of respective reactions are taken as kn4, kn5, the efficiency η of the conversion from oxygen atoms produced by electric discharge into ozone is given as follows:

$$\eta = Kn4 \times [O_2]/(Kn4 \times [O_2] + Kn5 \times [O_2]) = 1/\{1 + 2 \times Kn5/Kn4 \times [O]/[O_2]\} \quad (4)$$

Here, Kn4 and Kn5 are given as follows:

$$Kn4 = kn4(O_2) \times [O_2] + kn4(O) \times [O] + kn4(O_3) \times [O_3] + kn4(N_2) \times [N_2] \quad (5)$$

$$Kn5 = kn5(O_2) \times [O_2] + kn5(O) \times [O] + kn5(O_3) \times [O_3] + kn5(N_2) \times [N_2] \quad (6)$$

From the equation (4), the ozone conversion efficiency η is a function of the ratio between concentrations of oxygen atoms and oxygen molecules, and it decreases with an increase in the concentration of oxygen atoms.

Accordingly, when oxygen atoms in a high concentration are added at one time into a reaction gas containing oxygen molecules, it is impossible to produce ozone at a high efficiency because the ozone conversion efficiency is lowered.

The efficiency of the conversion from oxygen atoms into ozone decreases with an increase in the concentration of oxygen atoms as shown in the equation (4), and accordingly, to efficiently produce ozone at a relatively higher concentration, it is desirable that oxygen atoms are divided and repeatedly added in a low concentration (high in ozone conversion efficiency) into a reaction gas.

Additionally, in the ozone production chamber provided separately from the electric discharge chamber for producing oxygen atoms by electric discharge, the following reaction occurs, in addition to the ozone producing reaction and ozone decomposing reaction expressed by the reaction formulas (2), (3).

$$O+O_3 \rightarrow O_2+O_2 \quad (7)$$

The reaction of the formula (3) is negligible in the case of addition of oxygen atoms in a low concentration, and thereby oxygen atoms produced by electric discharge are efficiently converted into ozone. On the other hand, the reaction of the formula (7) is very slow, and thereby ozone produced in the ozone production chamber is little decomposed.

Accordingly, by repeating the step of adding oxygen atoms in a low concentration into a reaction gas in the ozone production chamber for efficiently producing ozone and further adding oxygen atoms in a low concentration into the reaction gas containing the produced ozone, the concentration of the finally produced ozone is increased depending on the number of addition of oxygen atoms in a low concentration into the ozone containing gas while the conversion from oxygen atoms into ozone is kept at a high efficiency.

Thus, it becomes possible to obtain ozone in a high concentration while suppressing the lowering of the ozone conversion efficiency.

Figure 24:
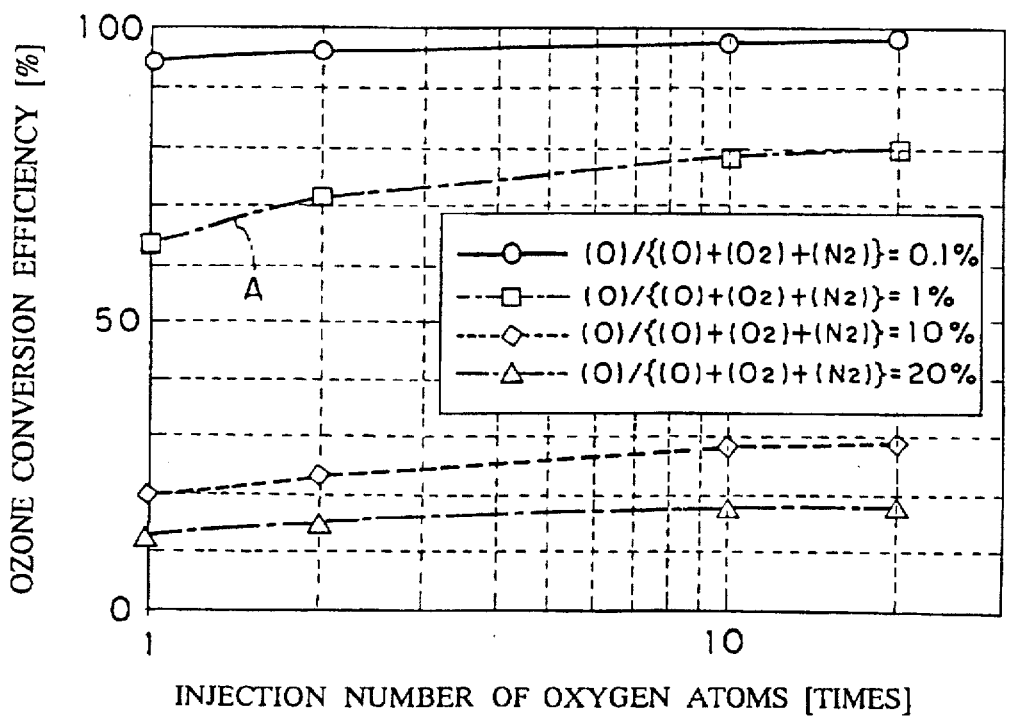
FIG. 24 is a graph showing a relationship between a divided injection number of oxygen atoms and an ozone conversion efficiency with the total concentration of oxygen atoms added to a reaction gas used as a parameter.

FIG. 24 shows a relationship between the divided injection number of oxygen atoms and the ozone conversion efficiency, with the total concentration of oxygen atoms added to a reaction gas used as a parameter.

The total concentration of oxygen atoms is selected at 0.1%, 1.0%, 10% and 20%, and the concentration of oxygen atoms for each injection is equivalent to a value obtained by dividing the total concentration by the injection number.

For example, a curve A in FIG. 24 is obtained by plotting the ozone conversion efficiency $\eta$ with respect to the injection number along the abscissa in the case where the total concentration of oxygen atoms added to a reaction gas is selected at 1.0% and the injection number is changed into one time (concentration: 1.0%), two times (concentration: 0.5%), ten times (concentration: 0.1%), and twenty times (concentration: 0.05%).

It is apparent from this graph that in the case where the total concentration of oxygen atoms added to a reaction gas is selected at a specified value, the ozone conversion efficiency $\eta$ is improved by decreasing the concentration for each injection and increasing the injection number.

The improvement effect in ozone conversion efficiency $\eta$, however, is substantially saturated when the injection number is more than ten times, and it is little enhanced when the injection number is more than twenty times.

Figure 25:
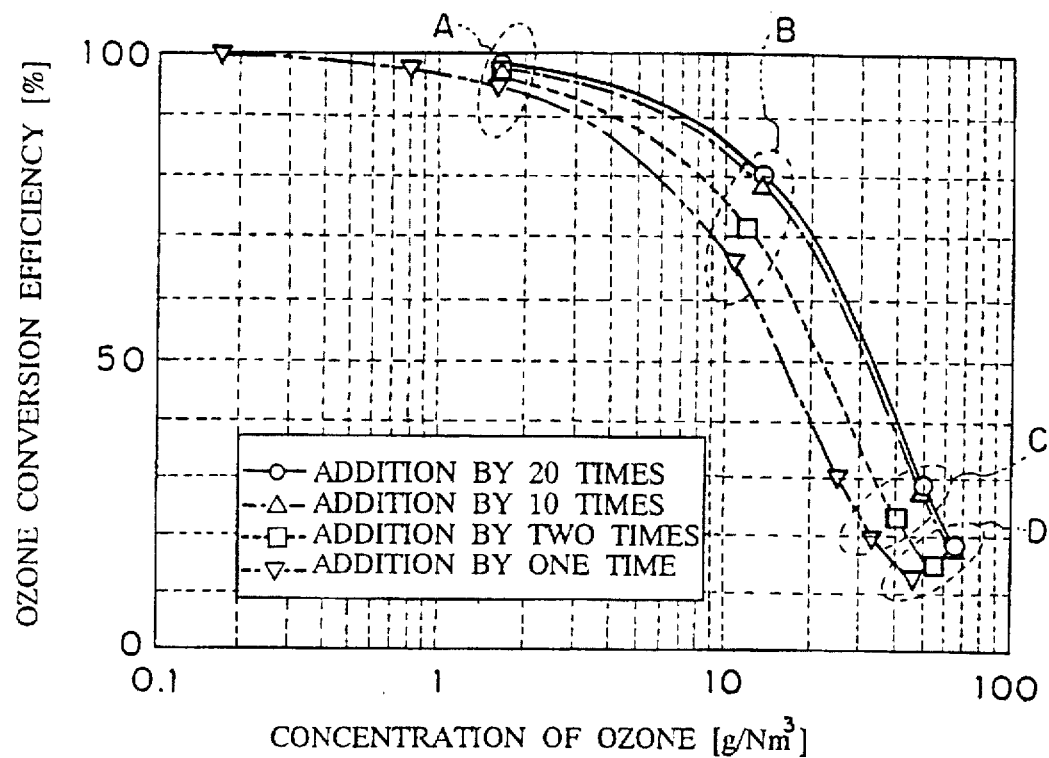
FIG. 25 is a graph showing the data shown in FIG. 24, in which the concentration of the produced ozone is plotted on the logarithmic abscissa.

FIG. 25 shows a relationship between the concentration of the produced ozone and the ozone conversion efficiency on the basis of the results shown in FIG. 24, wherein the concentration of the produced ozone is plotted along the logarithmic abscissa.

In this graph, groups A, B, C, D indicate data in the case where the total concentration of oxygen atoms is changed into 0.1%, 1.0%, 10%, and 20%, respectively.

Figure 26:
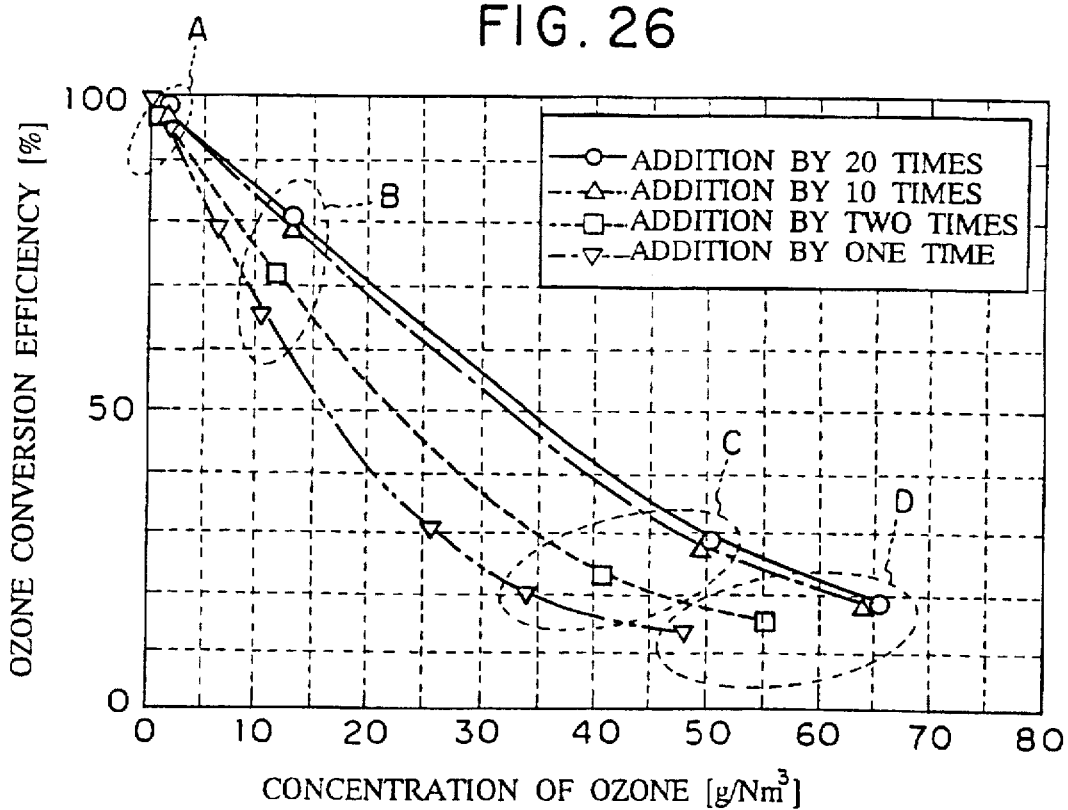
FIG. 26 is a graph showing the data shown in FIG. 25, in which the data are plotted on linear coordinates.

FIG. 26 is a graph in which the data in FIG. 25 are re-plotted on linear coordinates.

It is apparent from these graphs that, for example, in the case where ozone is produced with the total concentration of oxygen atoms added to a reaction gas selected at 1.0% (the data in the group B), the concentration of ozone produced by reaction repeated only one number is about 11 g/Nm$^3$ and the ozone conversion efficiency at this time is about 65%; however, the concentration of ozone produced by reaction repeated twenty times (concentration for each injection: 0.05%) is about 14 g/Nm$^3$ and the ozone conversion efficiency is improved to about 80%.

Thus, by repeating the step of adding oxygen atoms in a low concentration of several % or less into a reaction gas in the ozone production chamber for efficiently producing ozone and further adding oxygen atoms in a low concentration into the reaction gas containing ozone thus produced, the lowering of the efficiency of the conversion from oxygen atoms into ozone can be suppressed, and ozone in a high concentration can be produced as compared with the case where oxygen atoms are added at one time in the reaction gas.

An ozone producing apparatus will be described, in which an oxygen atom production chamber is separated from an ozone production chamber; and a gas containing oxygen atoms produced by electric discharge at a low pressure is not added at one time into a reaction gas, but the reaction gas (for example, air) is sequentially fed in a plurality of ozone production chambers and then the oxygen atom containing gas is fed in each ozone production chamber at a low pressure, wherein the concentration of oxygen atoms mixed with the reaction gas in the ozone production chamber is set at a specified low value.

Hereinafter, an ozone producing apparatus in a twelfth embodiment will be described in detail.

Figure 27:
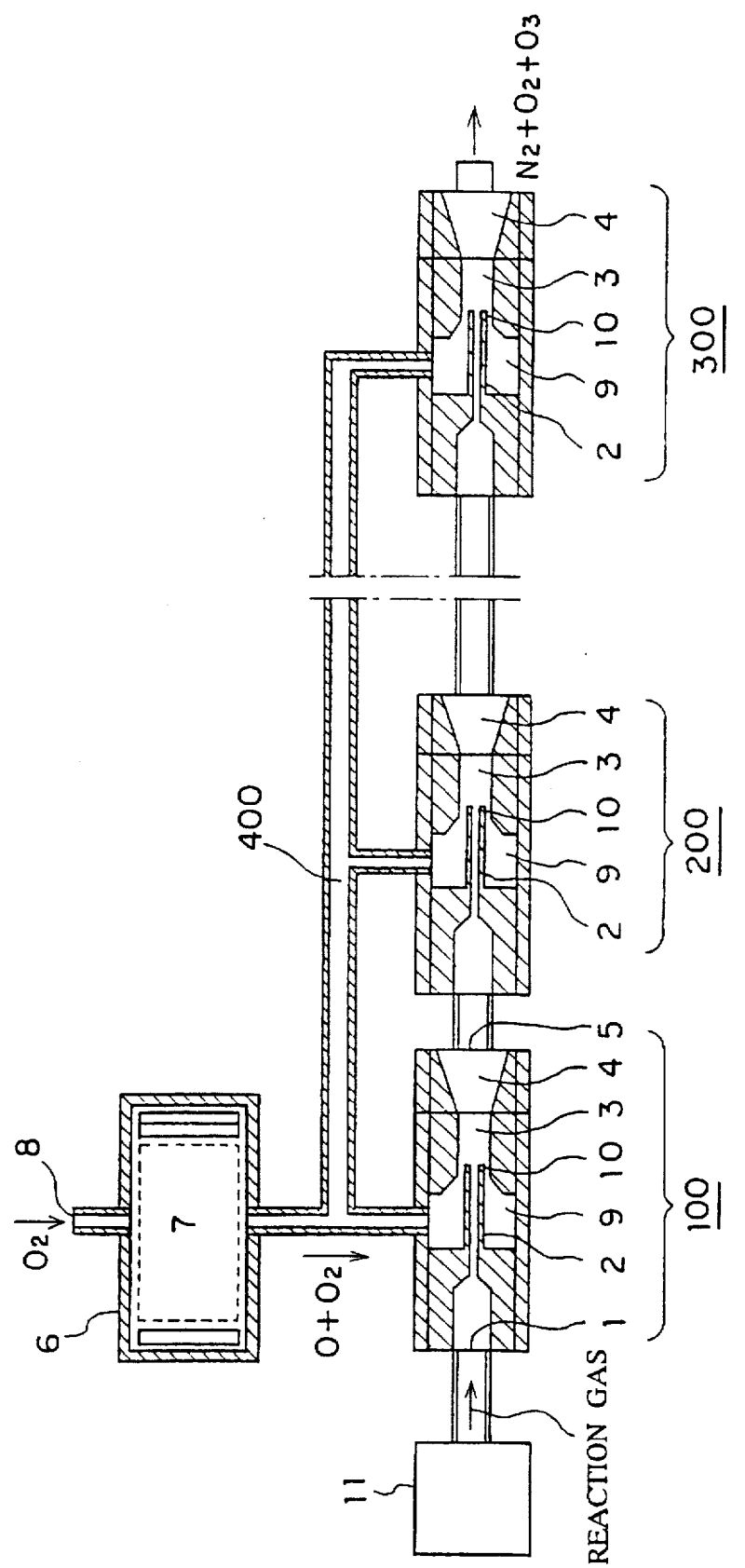
FIG. 27 is a schematic sectional view showing the configuration of a twelfth embodiment of the present invention.

FIG. 27 shows a schematic configuration of the apparatus in this embodiment, in which parts being the same as or similar to those shown in FIG. 1 are indicated by the same characters.

In FIG. 27, reference numeral 100 indicates a first stage ozone production portion; 200 is a second stage ozone production portion disposed in back of the first stage ozone production portion; and 300 is an N-th stage ozone production portion.

The apparatus in this embodiment uses a low pressure feeding means of an ejector type, like the apparatus shown in FIG. 21.

Each stage ozone production portion includes a nozzle 2, a throat 3, a diffuser 4, a pressure reduction chamber 9, and a gap 10, like the apparatus shown in FIG. 21.

Reference numeral 6 indicates an oxygen atom producing device for producing oxygen atoms from an oxygen atom containing source gas supplied from a source gas inlet 8.

Reference numeral 400 indicates an oxygen atom feed pipe for feeding oxygen atoms produced in the oxygen atom producing device 6 to each ozone production portion, and reference numeral 11 indicates a pressurizing means such as a compressor or a blower for pressurizing a reaction gas.

The operation of the ozone producing apparatus in this embodiment will be described. A reaction gas pressurized by the pressurizing means 11 flows into the nozzle 2 provided in the first ozone production portion 100 from the reaction gas inlet 1, and it is blown into the throat 3.

At this time, a gas present in the pressure reduction chamber 9 is entrapped into the throat 3 from the gap 10 provided between the nozzle 2 and the throat 3, so that the pressures of the pressure reduction chamber 9 and an electric discharge chamber 7 in the oxygen atom producing device 6 are reduced to a value not more than atmospheric pressure, more concretely, in a range of from several Torr to several hundred Torr.

In such a low pressure state, the following reaction occurs in the electric discharge chamber 7 to which an oxygen containing gas is supplied from the source gas inlet 8.

$$O_2+e \rightarrow O+O+e \quad (1)$$

Oxygen atoms O are thus produced. In the above reaction formula, character "e" indicates an electron. The oxygen atoms O produced in the formula (1) are converted into ozone by the following reaction.

$$O+O_2+M \rightarrow O_3+M \quad (2)$$

Alternatively, the oxygen atoms O are returned into oxygen molecules, that is, extinguished by the following reaction.

$$O+O+M \rightarrow O_2+M \quad (3)$$

In the above formulas (2), (3), character "M" indicates a third substance.

Each of the formulas (2), (3) is the so-called three body collision reaction in which the reaction proceeds in proportion to a square of the pressure, so that the reaction in each of the formulas (2), (3) is very slow in a low pressure electric discharge field. Here, when the concentration of $O_2$ is sufficiently higher than that of O, the ozone production reaction expressed by the formula (2) becomes dominant and the reaction expressed by the formula (3) is negligible.

Accordingly, when electric discharge is generated at a low pressure as in the apparatus in this embodiment, oxygen atoms produced by the formula (1) are little extinguished by the formulas (2), (3), so that oxygen atoms can be obtained at a high electric efficiency (number of produced oxygen atoms/power for electric discharge).

The oxygen atoms thus produced are sucked from the pressure reduction chamber 9 into the gap 10 between the nozzle 2 and the throat 3 by way of the oxygen atom feed pipe 400 while kept at a low pressure, and are mixed in a specified low concentration with the oxygen containing reaction gas fed from the nozzle 2 in the ozone production chamber composed of the throat 3 and the diffuser 4, to be efficiently converted into ozone at a high pressure by the reaction with oxygen molecules contained in the reaction gas in accordance with the reaction formula (2).

The addition of oxygen atoms at a specified concentration to a reaction gas may be performed by control of the produced amount of oxygen atoms in the oxygen atom producing device 6 or by provision of a valve for controlling the flow rate of an oxygen atom containing gas in the oxygen atom feed pipe.

The ozone containing gas (reaction gas containing the produced ozone) obtained in the first stage ozone production portion 100 is introduced from an ozone containing gas outlet 5 into the nozzle 2 of the second stage ozone production portion 200 while kept in the pressurized state.

Like the first stage ozone production portion 100, in the second stage ozone production portion 200, the gas containing oxygen atoms produced in the oxygen atom producing device 6 is sucked from the pressure reduction chamber 9 into the gap 10 between the nozzle 2 and the throat 3 by way of the oxygen atom feed pipe 400 while being kept at a low pressure and is mixed in a specified low concentration with the ozone containing reaction gas fed from the nozzle 2 in the ozone production chamber composed of the throat 3 and the diffuser 4, to be efficiently converted into ozone at a high pressure by the reaction with oxygen molecule contained in the reaction gas in accordance with the reaction formula (2).

In addition, as described above, the reaction expressed by the reaction formula (7) occurs in the ozone production chamber, in addition to the ozone producing reaction and the ozone decomposing reaction expressed by the reaction formulas (2), (3); however, since the reaction of the formula (7) is very slow, ozone produced in the ozone production chamber is little decomposed. Accordingly, in the second stage ozone production portion 200, ozone produced in the second stage ozone production portion 200 is accumulated to ozone produced in the first stage ozone production portion 100.

In the apparatus in this embodiment in which a plurality (N stages) of ozone production portions are arranged in series, ozone produced in each ozone production portion is gradually accumulated by repeating the step of feeding a reaction gas into the first stage ozone production portion by the pressurizing means, adding oxygen atoms in a specified low concentration into the reaction gas in the ozone production chamber for efficiently producing ozone, and further adding oxygen atoms in a specified low concentration to the gas containing the produced ozone at the next stage ozone production portion for producing ozone. Thus, it is possible to produce ozone in a high concentration while keeping the efficiency of the conversion from oxygen atoms into ozone at a high value.

Namely, in the apparatus in this embodiment, since an oxygen gas is dissociated at a low pressure in the same manner as in the prior art apparatus, it is possible to prolong the life of oxygen atoms and hence to efficiently produce the oxygen atoms.

Since the oxygen atom production chamber is so configured as to satisfy only the condition capable of efficiently producing oxygen atoms by stably keeping electric discharge, the interior of the production chamber may be heated at a high temperature and also electrodes are not required to be cooled. This is effective to increase the degree of freedom in design of an discharge electrode system and hence to simplify the entire configuration resulting in the reduced manufacturing cost. Also, since a high density power can be applied to the electric discharge system, it is possible to make compact the apparatus.

Since a gas containing oxygen atoms produced in the oxygen atom production chamber is divided and repeatedly added in a specified low concentration to the reaction gas containing oxygen atoms, the lowering of the ozone conversion efficiency can be suppressed, and ozone in a high concentration can be produced as compared with the prior art apparatus.

Embodiment 13

Figure 28:
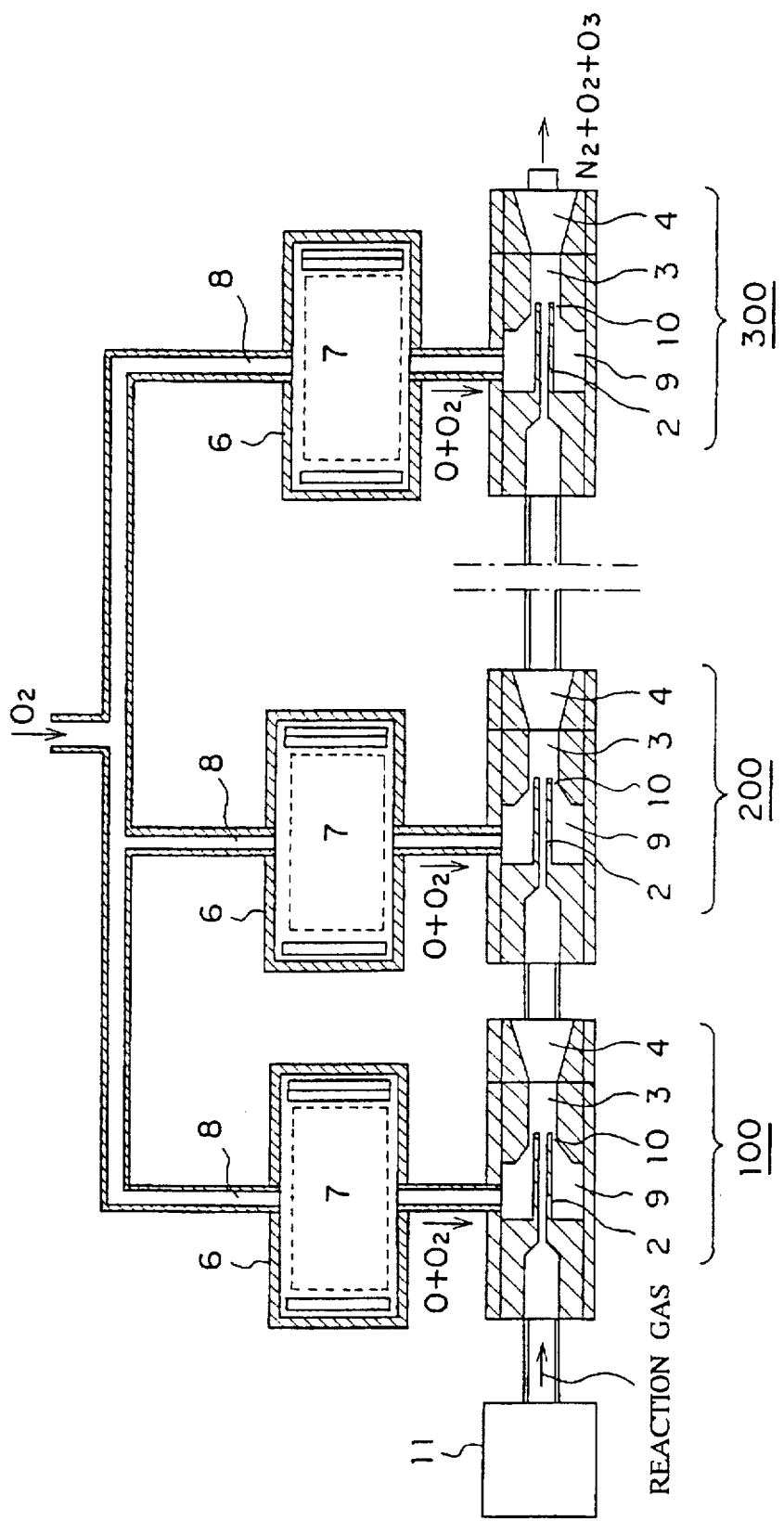
FIG. 28 is a schematic sectional view showing the configuration of a thirteenth embodiment of the present invention.

FIG. 28 shows a schematic configuration of an ozone producing apparatus according to a thirteenth embodiment of the present invention. Like the apparatus in Embodiment 12, the apparatus in this embodiment uses an ejector type low pressure feeding means. In addition, parts being the same as or similar to those shown in FIG. 21 are indicated by the same characters.

In FIG. 28, reference numeral 1 indicates an inlet for an oxygen containing reaction gas; 2 is a nozzle; 3 is a throat; 4 is a diffuser; and 5 is an outlet for an ozone containing gas. These are basic components forming the ejector.

The apparatus in this embodiment has a feature that oxygen atom producing devices 6 are individually connected to a first stage ozone production portion 100, a second ozone production portion 200, and an N-th stage ozone production portion 300, which are arranged in the vertical row.

Each ozone production portion includes a nozzle 2, a throat 3, a diffuser 4, pressure reduction chamber 9, and a gap 10, like the apparatus shown in FIG. 21.

The pressure reduction chamber 9 is kept at a pressure not more than atmospheric pressure, more concretely, in a range of from several Torr to several hundred Torr for introducing a gas containing oxygen atoms produced in the oxygen atom producing device 6 to a mixing portion with a reaction gas at a low pressure.

Next, the operation of the apparatus in this embodiment will be described. A reaction gas pressurized by a pressurizing means 11 flows into the nozzle 2 provided in the first ozone production portion 100 from the reaction gas inlet 1, and it is blown into the throat 3. At this time, a gas present in the pressure reduction chamber 9 is entrapped into the throat 3 from the gap 10 provided between the nozzle 2 and the throat 3, so that the pressure in an electric discharge chamber 7 of oxygen atom producing device 6 connected to the first stage ozone production portion 100 is also reduced to a value not more than atmospheric pressure, more concretely, in a range of from several Torr to several hundred Torr.

In the electric discharge chamber 7 of each oxygen atom producing device 6 to which the oxygen containing gas is supplied from a source gas inlet 8, the same reaction as described in Embodiment 1 occurs in such a low pressure, so that oxygen atoms can be obtained at a high electric efficiency (number of produced oxygen atoms/power for electric discharge).

The oxygen atoms thus produced are sucked into the gap 10 between the nozzle 2 and the throat 3 by way of the pressure reduction chamber 9 while kept at a low pressure, and are mixed with the oxygen containing reaction gas fed from the nozzle 2 in the ozone production chamber composed of the throat 3 and the diffuser 4, to be efficiently converted into ozone at a high pressure by the reaction with oxygen molecules contained in the reaction gas in accordance with the reaction formula (2).

The ozone containing gas (reaction gas containing the produced ozone) obtained in the first stage ozone production portion 100 is introduced from an ozone containing gas outlet 5 into the nozzle 2 of the second stage ozone production portion 200 while kept in the pressurized state.

Like the first stage ozone production portion 100, in the second stage ozone production portion 200, the gas containing oxygen atoms produced in the oxygen atom producing device 6 connected to the second stage ozone producing portion 200 is sucked from the pressure reduction chamber 9 into the gap 10 between the nozzle 2 and the throat 3 while being kept at a low pressure and is mixed with the ozone containing reaction gas fed from the nozzle 2 in the ozone production chamber composed of the throat 3 and the diffuser 4, to be efficiently converted into ozone at a high pressure by the reaction with oxygen molecule contained in the reaction gas in accordance with the reaction formula (2).

In this way, in the second stage ozone production portion 200, ozone produced in the second stage ozone production portion 200 is accumulated to ozone produced in the first stage ozone production portion 100.

In the apparatus in this embodiment in which the oxygen atom production chamber is separated from the ozone production chamber and a plurality (N stages) of ozone production portions are arranged in series, ozone produced in each ozone production portion is gradually accumulated similarly to the apparatus in Embodiment 12 by repeating the step of adding oxygen atoms in a specified low concentration into the reaction gas in the ozone production chamber of each ozone production portion for efficiently producing ozone, and further adding oxygen atoms in a specified low concentration to the gas containing the produced ozone at the next stage ozone production portion for producing ozone. Thus, it is possible to produce ozone in a high concentration while keeping the efficiency of the conversion from oxygen atoms into ozone at a high value.

Moreover, in the apparatus in this embodiment, an oxygen atom containing gas supplied from the oxygen atom producing device 6 of each ozone production portion is directly mixed with a reaction gas not by way of a relatively long flow path such as an oxygen atom feed pipe but by way of a short feed pipe unlike the apparatus in Embodiment 12, and accordingly, it is possible to suppress the re-combination of oxygen atoms being low in life before reaction with the reaction gas and hence to further improve the efficiency in mixing of oxygen atoms produced by the oxygen atom producing device 6 with the reaction gas.

Embodiment 14

While the oxygen atom producing device 6 is separated from the pressure reduction chamber 9 in the apparatus in Embodiment 12 or 13, a plurality of integral type ozone production portions each including an oxygen atom producing device integrated with a pressure reduction chamber may be arranged in series.

FIGS. 29A, 29B show a schematic configuration of an essential portion of an ozone producing apparatus according to a fourteenth embodiment of the present invention, wherein FIG. 29A is a vertical sectional view of the apparatus; and FIG. 29B is a sectional view taken on line A—A' of FIG. 29A.

In these figures, reference numeral 1 indicates an inlet for an oxygen containing reaction gas; 2 is a nozzle; 3 is a throat; 4 is a diffuser; and 5 is an outlet for an ozone containing gas. These are basic components forming an ejector.

Each integral type ozone producing portion in the apparatus in this embodiment includes a low pressure silent discharge type oxygen atom producing device integrated with the ejector as a low pressure feeding means.

Reference numeral 8 indicates a source gas inlet; 20 is a dielectric pipe such as a glass pipe; 21 is an electric supply electrode; 22 is a high voltage AC power supply; and 23 is an electric discharge field. These components form the oxygen atom producing device. In the apparatus in this embodiment, N-stages of the integral type ozone producing portions are arranged in series in accordance with the addition number (N) of the oxygen atom containing gas.

Since each integral type ozone producing portion integrally includes the oxygen atom producing device 6 and the pressure reduction chamber 9 in the apparatus in Embodiment 12 or 13, the basic operation of the apparatus in this embodiment is the same as that of the apparatus in Embodiment 12 or 13.

Oxygen atoms produced in the electric discharge field 23 are sucked from a pressure reduction portion into a gap between the nozzle 2 and the throat 3 at a low pressure, and is mixed with an oxygen containing reaction gas fed from the nozzle 2, to be efficiently converted into ozone at a high pressure by the reaction with oxygen molecules contained in the reaction gas in accordance with the reaction formula (2) in the first stage ozone producing chamber.

The gas containing ozone obtained in the first stage integral type ozone producing portion is introduced into an inlet of the ejector, that is, the nozzle 2 of the second stage integral type ozone producing portion, to be fed into the ozone producing chamber of the second stage integral type ozone producing portion.

Then, a gas containing oxygen atoms produced in the second stage integral type ozone producing portion is mixed with the ozone containing gas fed from the first stage integral type ozone producing portion in the second stage ozone producing chamber, to be further converted into ozone, thus producing the gas containing ozone in a concentration higher than in the first stage ozone producing portion.

For the apparatus including three or more stages of the integral type ozone producing portions, ozone is similarly produced in each of the stages subsequent to the second stage, and is accumulated.

In the apparatus in this embodiment, a gas containing oxygen atoms is divided and repeatedly added in a specified low concentration to a reaction gas like the apparatus in Embodiment 12 or 13 and each stage ozone producing portion integrally includes an oxygen atom producing device and a pressure reduction chamber, and accordingly, the produced oxygen atoms can be mixed with a reaction gas for a very short time to reduce a loss caused by return to oxygen molecules through re-combination of the oxygen atoms produced by electric discharge so that ozone can be produced at a high ozone production efficiency particularly in a high ozone concentration region.

Embodiment 15

Figure 30:
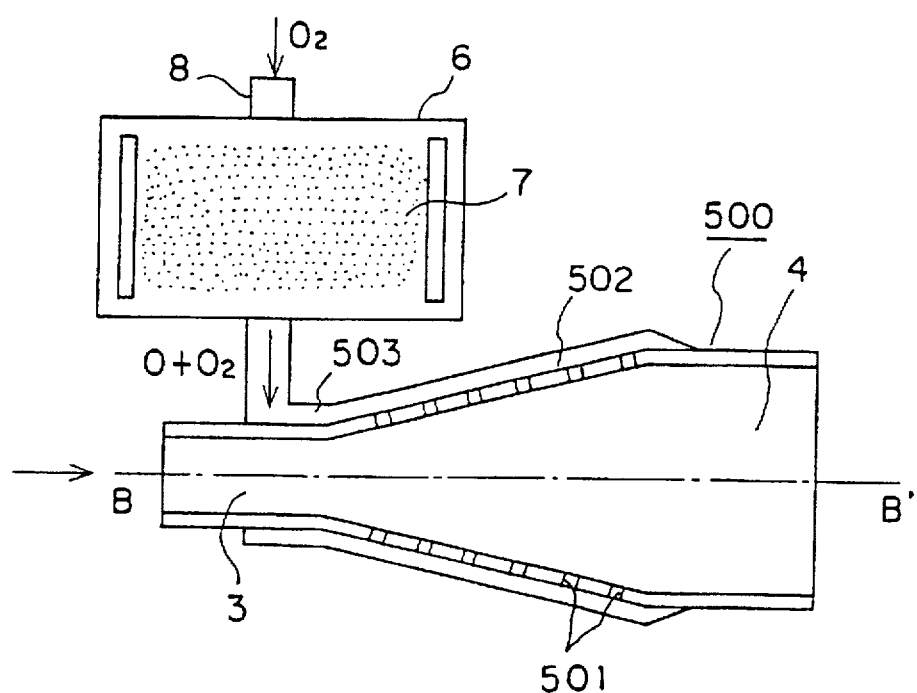
FIGS. 30A, 30B are schematic sectional views showing the configuration of a fifteenth embodiment of the present invention.
Figure 30:
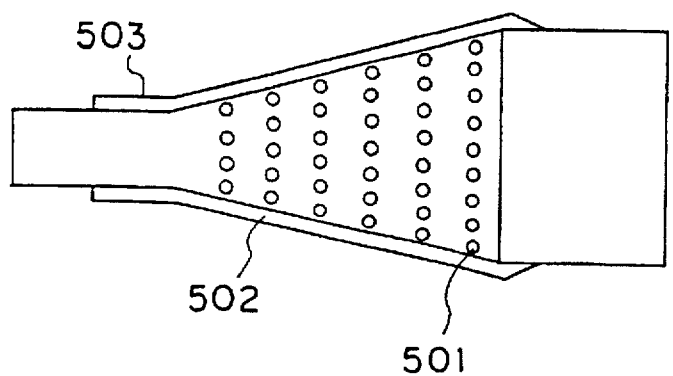

FIGS. 30A, 30B show a schematic configuration of an ozone producing apparatus according to a fifteenth embodiment of the present invention, in which parts being the same as or similar to those in FIGS. 27, 28, and 29A, 29B are indicated by the same characters.

In the apparatus in this embodiment, the repeated addition of a gas containing oxygen atoms produced by electric discharge is achieved by provision of a plurality of holes for injecting the oxygen atom containing gas in the peripheral wall of a diffuser forming an ozone producing chamber.

In FIGS. 30A, 30B, reference numeral 500 indicates an ozone producing chamber composed of a throat 3 and a diffuser 4. The peripheral wall of the diffuser 4 has a plurality of holes 501.

Reference numeral 502 indicates a pressure reduction chamber including an oxygen atom feed path 503 for introducing a gas containing oxygen atoms produced in an oxygen atom producing device 6 to an outer wall portion of the diffuser 4 at a low pressure. The pressure reduction chamber 502 is formed in such a manner as to cover the outer portions of the throat 3 and the diffuser 4 of the ozone producing chamber 500.

The pressure in the pressure reduction chamber 502 is kept at a value not more than atmospheric pressure, more concretely, in a range of several Torr to several hundred Torr.

The operation of the apparatus in this embodiment will be described. The production of oxygen atoms in the oxygen atom producing device 6 is the same as that in the apparatus in Embodiment 12.

A reaction gas to be mixed with the oxygen atom containing gas is pressurized by a pressurizing means (not shown) and is jetted to the diffuser 4 through the throat 3.

At this time, since the oxygen atom containing gas present in the pressure reduction chamber 502 is entrapped from the holes 501 provided in the diffuser 4, the pressure reduction chamber 502 and an electric discharge chamber 7 in the oxygen atom producing device 6 are reduced in pressure to a value not more than atmospheric pressure, more concretely, in a range of from several Torr to several hundred Torr.

A plurality of the holes 501 provided in the diffuser 4 are spaced at suitable intervals such that oxygen atoms are injected from holes arranged in a first row in the flow direction of a reaction gas and next oxygen atoms are injected from the holes arranged in a second row after an elapse of a specified time (for example, approximately one mill second) required for conversion from the previous oxygen atoms into ozone.

In the case where injection of oxygen atoms is required to be repeated two or more times, the holes in rows subsequent to the second row are similarly spaced at suitable intervals.

In this way, by repeatedly injecting divided oxygen atoms in a specified low concentration into the ozone production chamber 500, ozone can be efficiently produced by the reaction expressed by the reaction formula (2) in the diffuser 4.

In the apparatus having the above configuration, the oxygen atom producing portion is separated from the ozone producing portion, and accordingly, like the apparatus described in Embodiment 1, the oxygen atom producing portion and the ozone producing portion can be independently set at optimum conditions. For example, the oxygen atom producing portion can be set at a condition having a low pressure (several Torr to several hundred Torr) and a high temperature; and the ozone producing portion can be set at a condition having a high pressure (about 760 Torr or more) and a low temperature (about 400K or less).

Since an oxygen atom containing gas in a low concentration is repeatedly added to a reaction gas, it is possible to reduce a loss caused by return of oxygen molecules through re-combination of oxygen atoms produced by electric discharge and hence to produce ozone at a high ozone production efficiency particularly in a high ozone concentration.

Moreover, since the repeated addition of oxygen atoms in a reaction gas is achieved by provision of a plurality of rows of holes in the diffuser, provision of only one ozone production chamber is sufficient to cope with an increase in addition number of oxygen atoms. This makes it possible to realize a multi-addition type ozone producing apparatus of a very simple and compact structure.

While the details of electric discharge used for dissociating oxygen and producing oxygen atoms are not described in the apparatus in Embodiments 1 to 12, examples of electric discharge may include non-equilibrium discharge such as glow discharge, silent discharge or microwave discharge, or thermal plasma such as arc discharge or high frequency discharge, as described in the apparatuses in Embodiments 1 to 11.

As described above, according to the method of and apparatus for producing ozone, since an oxygen gas is dissociated at a low pressure, the life of oxygen atoms is prolonged and thereby oxygen atoms can be efficiently produced.

Since an oxygen atom production chamber is so configured as to satisfy only the condition capable of efficiently producing oxygen atoms by stably keeping electric discharge, the interior of the production chamber may be heated at a high temperature and also electrodes are not required to be cooled. This is effective to increase the degree of freedom in design of an discharge electrode system and hence to simplify the entire configuration resulting in the reduced manufacturing cost.

Since a high density power can be applied to the electric discharge system, it is possible to make compact the apparatus. Since ozone produced in an ozone production chamber which is in a non-electric discharge region is not exposed to electric discharge, the decomposition of ozone due to collision with electrons is not generated, to thereby prevent the lowering of the ozone production efficiency.

Even in the case of using a reaction gas containing nitrogen such as air, nitrogen oxide acting for decomposing ozone is not generated because the reaction gas is not exposed to electric discharge, with a result that ozone can be produced at a high production efficiency similar to that in the case of using oxygen as a reaction gas.

As described above, the present invention provides the method of producing ozone, including: an oxygen atom producing step of producing a first gas containing oxygen atoms by dissociating a supplied oxygen gas at a specified low pressure not more than atmospheric pressure; and an ozone producing step of mixing the first gas containing oxygen atoms produced in the oxygen atom producing step with a second gas containing oxygen, and allowing the first gas and the second gas to react with each other in non-electric discharge state for producing ozone. The method is advantageous in that both the steps can be independently performed at optimum conditions; a high density power can be applied because the oxygen atom producing step can be performed at a high temperature; and the decomposition of ozone due to collision with electrons is not generated because the ozone producing step is performed in a non-electric discharge state, to thereby produce ozone at a very high efficiency.

The present invention also provides the method in which ozone is produced in a non-electric discharge state in the ozone producing step. The method is advantageous in that, the decomposition of ozone due to $NO_x$ is not generated even when air is used as the second gas, to thereby efficiently produce ozone at a low cost using air as a source gas.

The present invention also provides the method in which non-equilibrium electric discharge is used as the means for dissociating an oxygen gas in the oxygen atom producing step. The method is advantageous in that oxygen molecules can be dissociated at a low gas temperature and the gas temperature after mixing with the second gas in the ozone producing step can be lowered, to thereby produce ozone at a very high efficiency.

The present invention also provides the method in which the oxygen atom producing step uses thermal plasma as the means for dissociating an oxygen gas, and the ozone producing step cools a mixed gas of the first and second gases in the mixing step of the first and second gases. The method is advantageous in that it is possible to produce ozone at a high efficiency similar to that in the case of producing oxygen atoms by non-equilibrium electric discharge.

The present invention provides the apparatus for producing ozone, including: an oxygen atom producing portion for dissociating a supplied oxygen gas at a low pressure not more than atmospheric pressure so as to produce a first gas containing oxygen atoms; an ozone producing portion for mixing the first gas containing oxygen atoms supplied from the oxygen atom producing portion with a second gas containing oxygen, and allowing the first and second gases to react with each other for producing ozone; and a low pressure feeding means for reducing a pressure in the oxygen atom producing portion at a specified low value not more than atmospheric pressure, and feeding the first gas to the ozone producing portion in a pressure reduction state. The apparatus is advantageous in that both the oxygen atom producing portion and the ozone producing portion can be independently set at optimum conditions; a high density power can be applied because the oxygen atom producing portion can be heated at a high temperature; and the decomposition of ozone due to collision with electrons is not generated because the ozone producing portion produces ozone in a non-electric discharge state, to thereby produce ozone at a very high efficiency.

The present invention also provides the apparatus in which non-equilibrium electric discharge such as glow discharge, silent discharge or microwave discharge at a low pressure is used as the means for dissociating an oxygen gas. The apparatus is advantageous in that oxygen molecules can be efficiently dissociated in a low gas temperature; the gas temperature after mixing with the second gas can be lowered in the ozone producing portion; and the decomposition of the produced ozone is not generated because the ozone producing portion is not exposed to electric discharge, to thereby produce ozone at a very high efficiency.

The present invention also provides the apparatus in which the oxygen atom producing portion uses thermal plasma as the means for dissociating an oxygen gas, and the ozone producing portion cools the mixed gas of the first and second gases in the mixing step of the first and second gases. The apparatus is advantageous in that it is possible to produce ozone at a high efficiency similar to that in the case of producing oxygen atoms by non-equilibrium electric discharge.

The present invention also provides the apparatus in which the low pressure feeding means is composed of an ejector having: an inlet into which the second gas pressurized is injected; a nozzle, disposed spaced from the ozone producing portion at a specified gap, for jetting the second gas injected from the inlet to the ozone producing portion; and a pressure reduction chamber disposed in the vicinity of the nozzle and the gap, which is reduced in pressure by jetting of the second gas from the nozzle, thereby reducing the pressure in the oxygen atom producing portion at a specified low value not more than atmospheric pressure and feeding the first gas containing oxygen atoms produced by the oxygen atom producing portion to the ozone producing portion through the gap in a pressure reduction state. The apparatus is advantageous in that it is possible to simply set the pressures of the oxygen atom producing portion and the ozone producing portion at desirable values and to realize mixing the first and second gases and discharge of ozone produced by the ozone producing portion with a simple structure, and hence to efficiently produce ozone with a small-sized structure.

The present invention also provides the method of producing ozone, including: an oxygen atom producing step of producing a first gas containing oxygen atoms by dissociating a supplied oxygen gas at a specified low pressure not more than atmospheric pressure; and an ozone producing step of mixing a second gas containing oxygen with the first gas containing oxygen atoms produced in the oxygen atom producing step, and allowing the first gas and the second gas to react with each other in non-electric discharge state for producing ozone, wherein the ozone producing step is divided into a plurality of stages for repeating production of ozone by adding the first gas to the second gas containing oxygen pressurized and supplied and accumulating ozone produced in each of the stages. The method is advantageous in that it is possible to produce ozone in a high concentration while keeping a high efficiency in conversion from oxygen atoms to ozone.

The present invention also provides the apparatus for producing ozone, including: an oxygen atom producing portion for dissociating a supplied oxygen gas at a low pressure not more than atmospheric pressure so as to produce a first gas containing oxygen atoms; a plurality of ozone producing units arranged in series, each of the ozone producing units being adapted to mix the first gas with a second gas containing oxygen pressurized and supplied thereto, and allowing the first and second gases to react with each other at a specified oxygen atom concentration in a non-electric discharge state for producing ozone; and low pressure feeding means for reducing a pressure in the oxygen atom producing portion to a low value not more than atmospheric pressure and feeding the first gas to each of a plurality of the ozone producing units in a pressure reduction state; whereby sequentially feeding the second gas containing ozone in a plurality of the ozone producing units in the flow direction of the second gas for accumulating ozone produced in each of the ozone producing units. The apparatus is advantageous in that it is possible to produce ozone in a high concentration while keeping the high efficiency in conversion from oxygen atoms to ozone.

The present invention also provides the apparatus in which each of a plurality of the ozone producing portions is formed in a one-body including the oxygen atom producing portion and the low pressure feeding means by using a pressure reduction chamber of the corresponding one of the low pressure feeding means as the oxygen atom producing portion. The apparatus is advantageous in that the produced oxygen atoms can be mixed with a reaction gas for a very short time to reduce a loss caused by return to oxygen molecules through re-combination of the oxygen atoms produced by electric discharge so that ozone can be produced at a high ozone production efficiency particularly in a high ozone concentration region.

The present invention also provides the apparatus for producing ozone, including: an oxygen atom producing portion for dissociating a supplied oxygen gas at a low pressure not more than atmospheric pressure so as to produce a first gas containing oxygen atoms; an ozone producing portion for mixing the first gas containing oxygen atoms supplied from the oxygen atom producing portion with a second gas containing oxygen, and allowing the first and second gases to react with each other for producing ozone; and a low pressure feeding means for reducing a pressure in the oxygen atom producing portion at a specified low value not more than atmospheric pressure, and feeding the first gas to the ozone producing portion in a pressure reduction state, wherein the ozone producing portion has a plurality of rows of holes spaced from each other at specified intervals in the flow direction of the second gas, and the low pressure feeding means feeds the first gas to the ozone producing portion through a plurality of rows of the holes while keeping the pressure reduction state of the first gas. The apparatus is advantageous in that it is possible to produce ozone in a high concentration while keeping the high efficiency in conversion from oxygen atoms into ozone with a simple structure.

What is claimed is:

1. A method of producing ozone, comprising:
    an oxygen atom producing step of producing a first gas containing oxygen atoms by dissociating a supplied oxygen gas at a specified low pressure not more than atmospheric pressure; and
    an ozone producing step of mixing said first gas containing oxygen atoms produced in said oxygen atom producing step with a second gas containing oxygen, and allowing said first gas and said second gas to react with each other in a non-electric discharge state for producing ozone.

2. A method of producing ozone according to claim 1, wherein air is used as said second gas.

3. A method of producing ozone according to claim 2, wherein said oxygen atom producing step includes the step of dissociating the oxygen gas using non-equilibrium electric discharge.

4. A method of producing ozone according to claim 2, wherein said oxygen atom producing step uses thermal plasma as said means for dissociating an oxygen gas, and said ozone producing step cools a mixed gas of said first and second gases in the mixing step of said first and second gases.

5. A method of producing ozone according to claim 1, wherein said oxygen atom producing step includes the step of dissociating the oxygen gas using non-equilibrium electric discharge.

6. A method of producing ozone according to claim 1, wherein said oxygen atom producing step includes the step of dissociating the oxygen gas using thermal plasma, and said ozone producing step includes the step of cooling the mixed gas of said first and second gases.

7. A method of producing ozone according to claim 1, wherein said ozone producing step is divided into a plurality of stages for repeating production of ozone by adding said first gas to said second gas containing oxygen pressurized and supplied and accumulating ozone produced in each of said stages.

8. An ozone producing apparatus comprising:
    an oxygen atom producing portion including means for dissociating a supplied oxygen gas at a low pressure not more than atmospheric pressure to produce into a first gas containing oxygen atoms;
    an ozone producing portion including means for mixing said first gas containing oxygen atoms supplied from said oxygen atom producing portion with a second gas containing oxygen, and allowing said first and second gases to react with each other for producing ozone; and
    a low pressure feeding means for reducing a pressure of the first gas in said oxygen atom producing portion at a specified low value not more than atmospheric pressure, and feeding said first gas to said ozone producing portion in a pressure reduction state.

9. An ozone producing apparatus according to claim 8, wherein non-equilibrium electric discharge is used as said means for dissociating said oxygen gas in said oxygen atom producing portion.

10. An ozone producing apparatus according to claim 9, wherein glow discharge is used as said non-equilibrium electric discharge.

11. An ozone producing apparatus according to claim 9, wherein silent discharge is used as said non-equilibrium electric discharge.

12. An ozone producing apparatus according to claim 9, wherein microwave discharge is used as said non-equilibrium electric discharge.

13. An ozone producing apparatus according to claim 9, wherein said low pressure feeding means comprises:
    means for pressurizing said second gas;
    an inlet into which said second pressurized gas is injected;
    a nozzle, disposed spaced from said ozone producing portion at a specified gap, for jetting said second gas injected from said inlet to said ozone producing portion; and
    a pressure reduction chamber disposed in the vicinity of said nozzle and said gap, which is reduced in pressure by jetting of said second gas from said nozzle, to reduce the pressure in said oxygen atom producing portion at a specified low value not more than atmospheric pressure and to feed said first gas containing oxygen atoms produced by said oxygen atom producing portion to said ozone producing portion through said gap in a pressure reduction state.

14. An ozone producing apparatus according to claim 8, wherein in said oxygen atom producing portion said means for dissociating an oxygen gas includes means for using thermal plasma, and said ozone producing portion includes means for cooling the mixed gas of said first and second gases.

15. An ozone producing apparatus according to claim 14, wherein said low pressure feeding means comprises:

means for pressurizing said second gas;

an inlet into which said second pressurized gas is injected;

a nozzle, disposed spaced from said ozone producing portion at a specified gap, for jetting said second gas injected from said inlet to said ozone producing portion; and a pressure reduction chamber disposed in the vicinity of said nozzle and said gap, which is reduced in pressure by jetting of said second gas from said nozzle, to reduce the pressure in said oxygen atom producing portion at a specified low value not more than atmospheric pressure and to feed said first gas containing oxygen atoms produced by said oxygen atom producing portion to said ozone producing portion through said gap in a pressure reduction state.

16. An ozone producing apparatus according to claim 8, wherein said low pressure feeding means comprises:

means for pressurizing said second gas;

an inlet into which said second pressurized gas is injected;

a nozzle, disposed spaced from said ozone producing portion at a specified gap, for jetting said second gas injected from said inlet to said ozone producing portion; and a pressure reduction chamber disposed in the vicinity of said nozzle and said gap, into which said second gas is jetted from said nozzle, to reduce the pressure in said oxygen atom producing portion at a specified low value not more than atmospheric pressure and to feed said first gas containing oxygen atoms produced by said oxygen atom producing portion to said ozone producing portion through said gap in a pressure reduction state.

17. An ozone producing apparatus according to claim 8, wherein said ozone producing portion comprises a plurality of ozone producing units arranged in series, each of said ozone producing units being adapted to mix said first gas with said second gas containing oxygen pressurized and supplied thereto and allowing said first and second gases to react with each other in a specified oxygen atom concentration in a non-electric discharge state for producing ozone, and each of said ozone producing units including a low pressure feeding means for reducing a pressure in said oxygen atom producing portion at a specified low value not more than atmospheric pressure and feeding said first gas to each of said ozone producing units in a pressure reduction state, to sequentially feed said second gas containing ozone in a plurality of said ozone producing units in the flow direction of said second gas for accumulating ozone produced in each of said ozone producing units.

18. An ozone producing apparatus according to claim 17, wherein each of a plurality of said ozone producing portions is formed in a one-body including said oxygen atom producing portion and said low pressure feeding means by using a pressure reduction chamber of the corresponding one of said low pressure feeding means as said oxygen atom producing portion.

19. An ozone producing apparatus according to claim 8, wherein said ozone producing portion has a plurality of rows of holes spaced from each other at specified intervals in the flow direction of said second gas, and said low pressure feeding means feeds said first gas to said ozone producing portion through a plurality of rows of said holes while keeping the pressure reduction state of said first gas.

* * * * *